United States Patent [19]

Stratton

[11] 4,195,317

[45] Mar. 25, 1980

[54] VIDEO RECORDING AND PLAYBACK EDITING SYSTEM WITH DISPLAYED CUE SIGNALS

[75] Inventor: Boyd L. Stratton, Woodside, Calif.

[73] Assignee: Arvin Industries, Inc., Columbus, Ind.

[21] Appl. No.: 894,413

[22] Filed: Apr. 7, 1978

Related U.S. Application Data

[63] Continuation-in-part of Ser. No. 842,247, Oct. 14, 1977, abandoned.

[51] Int. Cl.² .................... H04N 5/78; G11B 27/02
[52] U.S. Cl. ...................................... 360/14; 360/33; 360/72.1; 360/10
[58] Field of Search ................... 360/14, 10, 35, 33, 360/72, 31, 72.1; 358/127, 128; 179/100.4 D

[56] References Cited

U.S. PATENT DOCUMENTS

| B 347,661 | 3/1976 | Iyama | 360/10 |
|---|---|---|---|
| 3,518,366 | 6/1970 | Phan | 360/10 |
| 3,637,928 | 1/1972 | Poulett | 360/10 |
| 3,649,753 | 3/1972 | Kinjo | 360/72 |
| 3,789,378 | 1/1974 | Bonzano | 360/77 |
| 3,931,457 | 1/1976 | Mes | 360/72 |
| 4,058,840 | 11/1977 | Kasprzak | 360/10 |

FOREIGN PATENT DOCUMENTS 1254295  11/1971  United Kingdom ............... 360/14

OTHER PUBLICATIONS

Television Broadcasting, by H. E. Ennes, © 1973, by Howard W. Sams & Co., Inc., pp. 309-331.
"A Unique Timing Reference System for Broadcast Videotape Recorders", by B. H. Dann, Feb. 1974, Journal of SMPTE, vol. 85, pp. 100-104.
"Automated Video Tape Editing System", by Shimada et al., Toshiba Review, Oct. 1971, pp. 5-10.

*Primary Examiner*—Bernard Konick
*Assistant Examiner*—Alan Faber
*Attorney, Agent, or Firm*—Biebel, French & Nauman

[57] ABSTRACT

A video recorder and playback system for storing video information consisting of video frames successively presented at a standard frame rate, each frame having first and second interlaced video fields, and for playing back the video information in a desired sequence to produce a video output signal, providing either slow motion or normal motion effects when viewed on a monitor, includes a frame recorder. The frame recorder has a rotatable recording medium, first and second transducer means for recording and playing back video frames in recording tracks on the recording medium, and means for rotating the medium at the standard frame rate such that a video frame is recorded in each of the recording tracks. A field store is responsive to the recorder for storing a field of video information replayed from the recorder. A switch is connected to a field store and to the recorder for providing at the switch output video information from the field store or the recorder in response to a delay field signal. The switch changes switching state and the transducer means are stepped to provide at the switch output replayed video information in the same sequence in which it was recorded or, alternatively, in a sequence different from that in which it was recorded, with the sequence of fields within the frames properly ordered for interlace. The video recorder system also includes a circuit providing a cue display signal on a video monitor which is indicative of the progression of the transducer means to successive tracks during both recording and playback.

20 Claims, 17 Drawing Figures

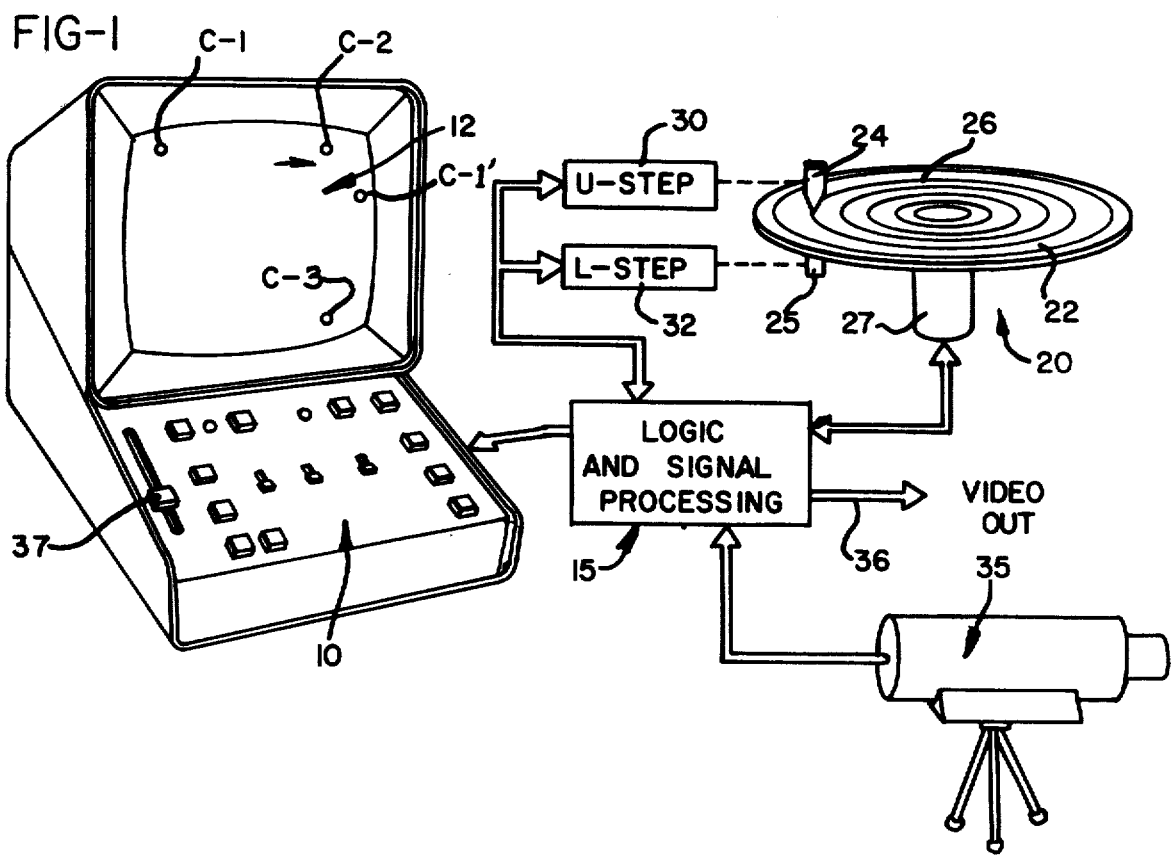

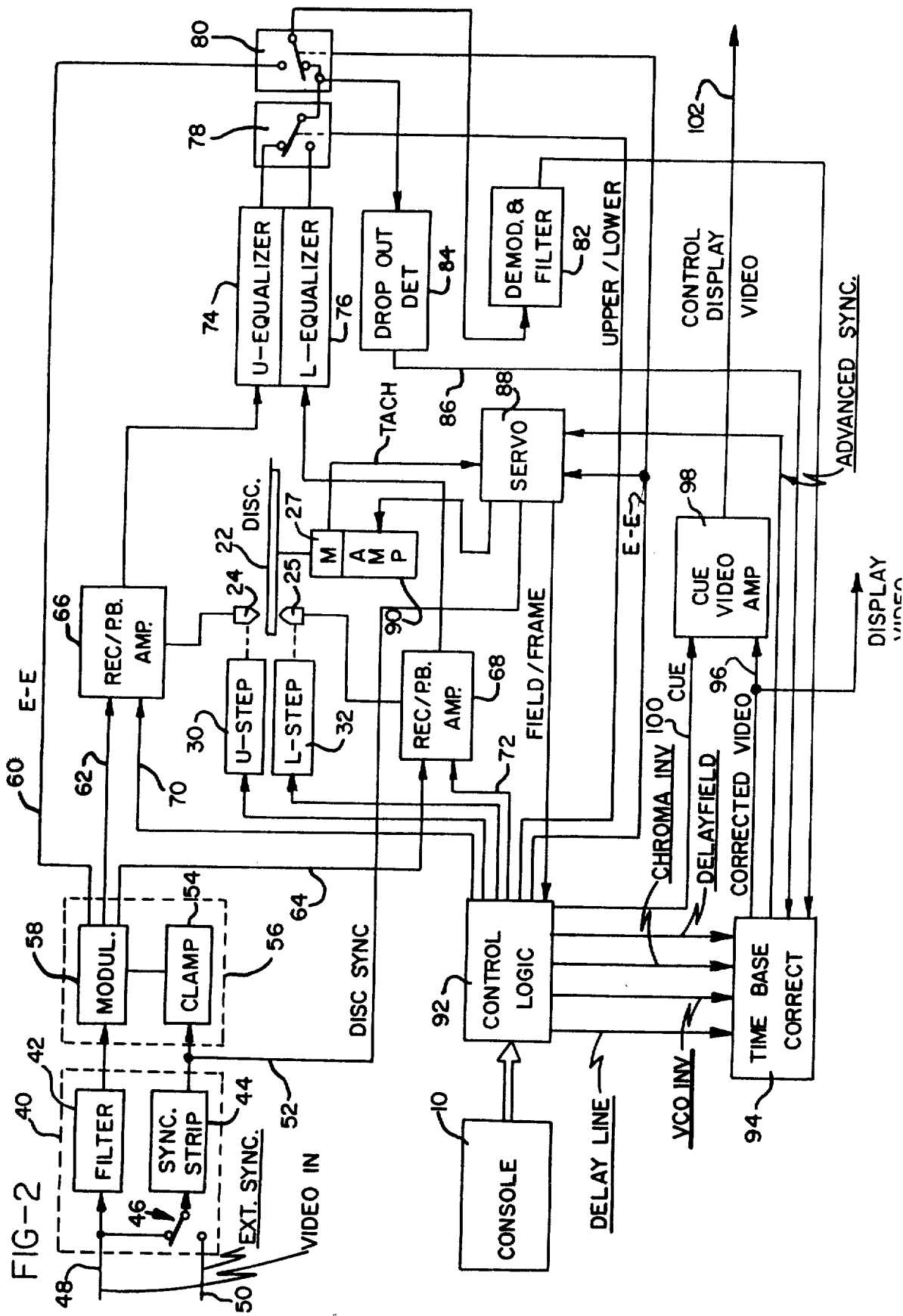

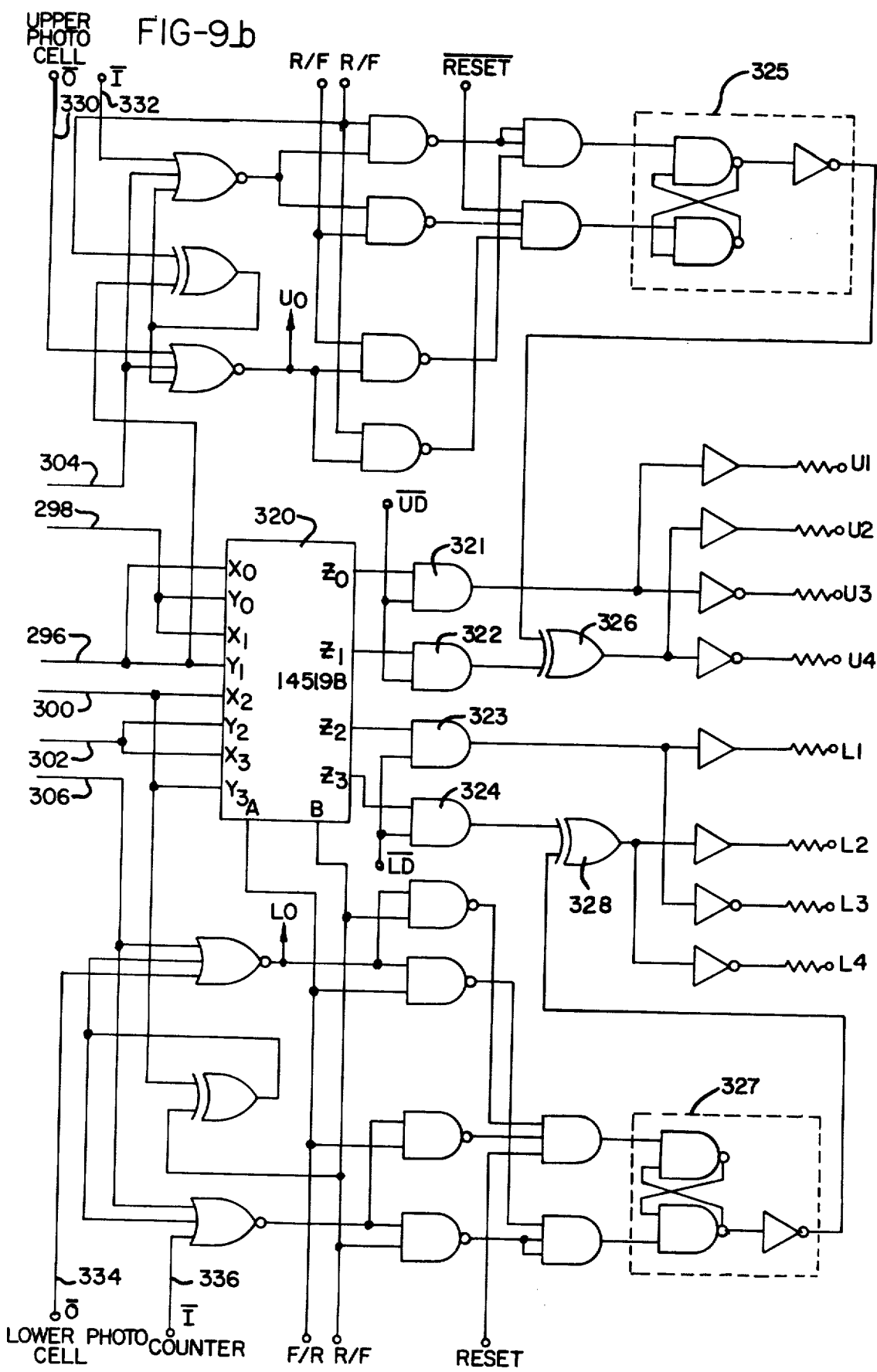

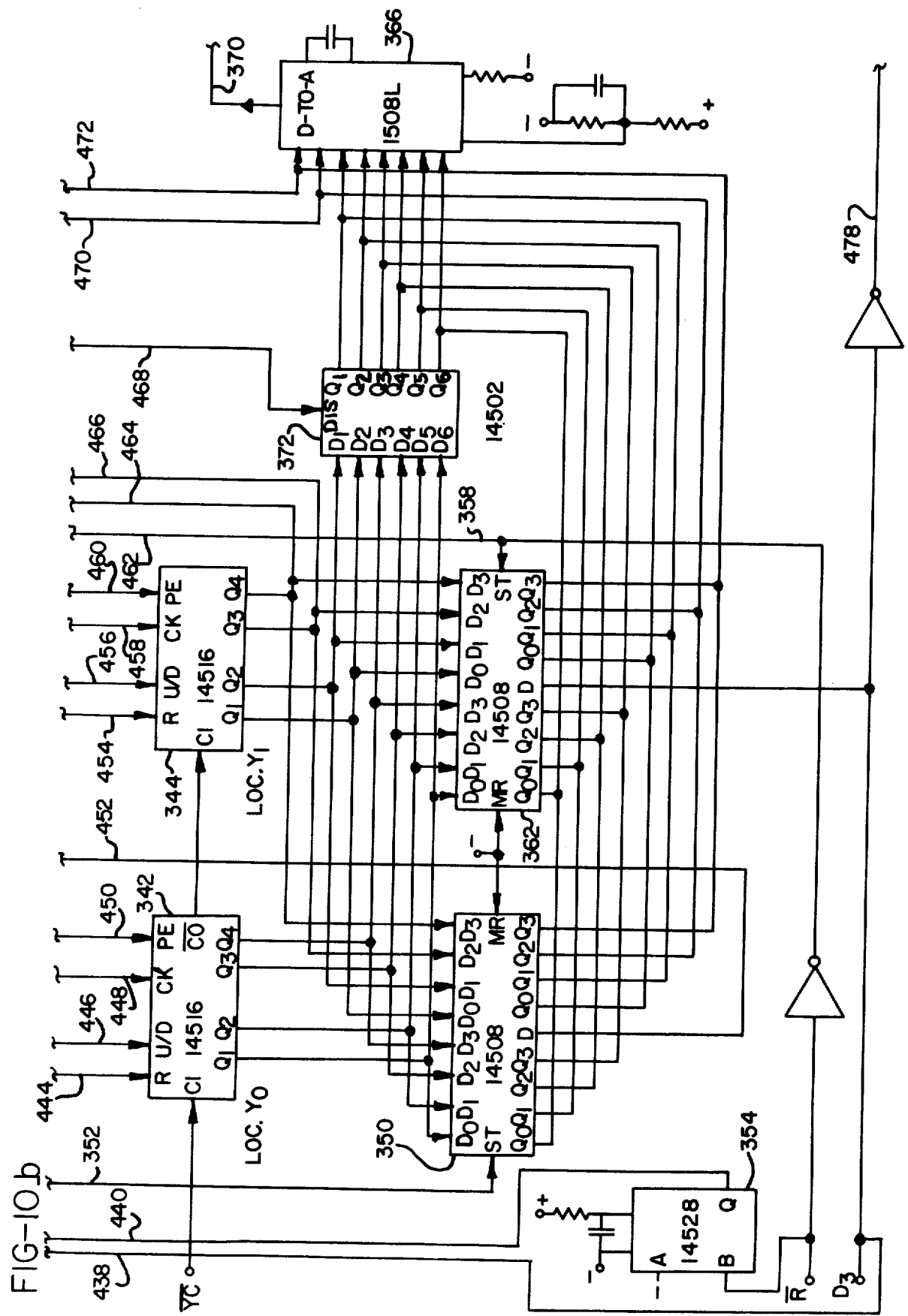

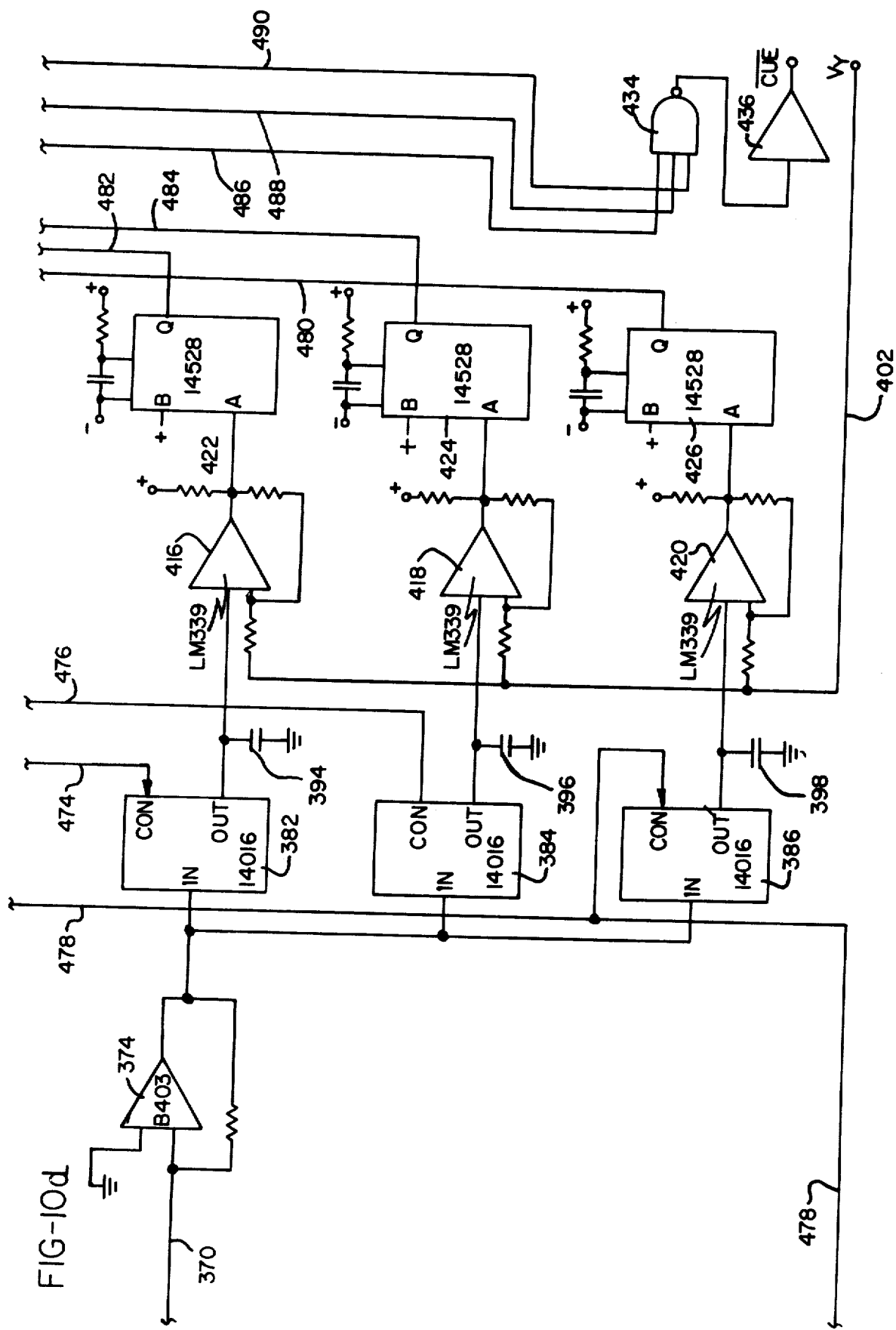

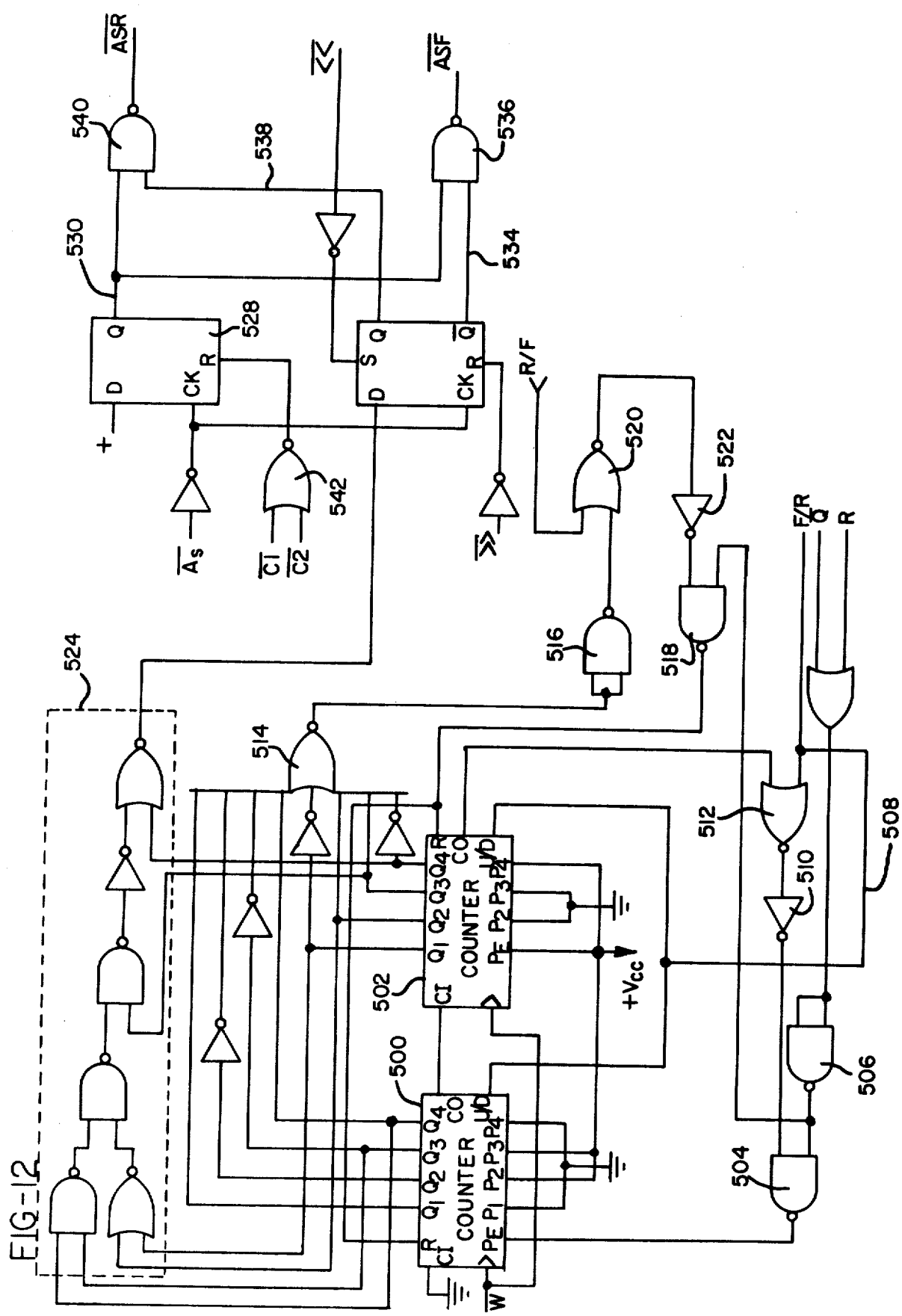

VIDEO RECORDING AND PLAYBACK EDITING SYSTEM WITH DISPLAYED CUE SIGNALS

This application is a continuation in part of U.S. patent application Ser. No. 842,247, filed Oct. 14, 1977, (now abandoned) and assigned to the assignee of the present invention.

BACKGROUND OF THE INVENTION

The present invention relates to video recorders of the type which provide a relatively limited recording capacity and which are capable of replaying the recorded video information either in real time or in a variable speed, slow motion replay mode. Such recorders are particularly adapted for use in televising or recording sporting events where a continuous video recorder of a substantially greater capacity may be used to provide a recording of the entire event. A recorder of the type to which the present invention is directed is selectively employed to record portions of the event which are later replayed, either at normal speed or in a manner to produce a slow motion effect.

The standard NTSC color video signal used in the United States consists of a succession of video frames, each frame consisting of two video interlaced fields each of which consists of a series of horizontal lines of video information, separated by horizontal line timing pulses. Each frame contains a field of a first type, termed an odd field, and a field of a second type, termed an even field. In order to produce the desired interlace between the two fields of a frame, the beginning of each even field occurs at a time offset by one half video line time with respect to the horizontal timing pulses, while the beginning of each odd field occurs with no offset.

Color video signals include a chroma component. The phase of the chroma component at the end of each field will lag the phase of the chroma at the beginning of the field by 90°. Thus, it is seen there are frames of video information of a first type in which the chroma component varies in phase from 0° to 180° and frames of a second type in which the chroma component varies from 180° to 360°. In order for successful operation of a recorder, the recorder must provide during replay successive frames which alternate in frame type, with each of the frames containing a field of a first field type and a field of a second field type.

A typical prior art slow motion recorder is shown in U.S. Pat. No. 3,637,928, issued Jan. 25, 1972, to Poulett. The Poulett recorder uses four video recording disc surfaces with four corresponding record/playback heads to record, respectively, the four fields making up the frames of the first and second frame types. Each of the recording disc surfaces is rotated at the field rate and, during recording and playback, the record/playback heads are moved to predetermined recording tracks on the disc surfaces. During playback, the sequence in which the fields are replayed may be varied in order to produce various slow motion effects.

Another recording device is shown in publication No. B 347,661, published Mar. 16, 1976, under the Second Trial Voluntary Protest Program, with Iyama, et al as inventors. The Iyama, et al recorder records only single fields and reproduces them in such a manner that they are interlaced into frames for display. A major problem with respect to video recorders operating at 3600 r.p.m. (the field rate in the NTSC system) is the limitation which this imposes on the recorder storage capacity, since only one field can be stored in each recording track. Another problem with such disc recorders is that excessive wear of the disc and transducer heads may occur over a period of time.

U.S. Pat. No. 3,518,366, issued June 30, 1970, to Phan, discloses a video recording system capable of reproducing video information in a slow motion format. The Phan system uses a single recording disc which is rotated at the frame rate (1800 r.p.m.) of the video signal. A plurality of frames of video information are recorded on one side of the disc in a spiral recording track. A pair of record/replay transducers cooperate with a single circular recording track on the opposite side of the disc to construct a single frame from a field which is replayed from the spiral recording track. This synthesized frame, having identical fields, is replayed a number of times under control of a slow motion timer in order to produce a slow motion video output signal. The Phan system is somewhat limited in flexibility, however, since it is capable of providing slow motion reproduction rates only at integer multiples of the rate at which the information is recorded.

U.S. Pat. No. 4,058,840, issued Nov. 15, 1977, to Kasprzak, and assigned to the assignee of the present invention, discloses a video frame recorder which includes control circuitry to re-record a field from one-half of a disc recording track onto the other half of the recording track such that an interlaced frame, consisting of two identical fields, is produced for replay. Although using a disc frame recorder, the Kasprzak system is not capable of providing slow motion video signals during replay.

In video recorders of the type to which the present invention is directed, it is advantageous that the operator of the recorder have provided to him a visual indication of the recording operation and, during replay, a visual indication of the replay operation. A recorder of the type to which the present invention is directed permits short portions of a video signal to be recorded and then replayed, with or without an altered time base effect as desired by the recorder operator. This type of recorder typically has a relatively short real time storage capacity and thus video information is continuously recorded over previously recorded video information. When used to provide slow motion instant replay of a sporting event, for example, a recorder of this type will typically be left in the record mode. The operator may note an event of interest to which he may later wish to return. In the past, a recording indicator has typically been provided in the form of a dial arrangement which rotates as the transducer heads are stepped to successive recording tracks. The operator will know that if the event of interest occurred while the dial pointer was directed to a certain point on the dial, he may replay the event of interest by operating the recorder during replay such that the dial pointer again is directed to this point on the dial. With such an arrangement, however, it is necessary for the operator to view the indicator dial and, simultaneously, the video monitor. The operator must take care, as well, that the recorder not be left in the record mode for a period sufficient to result in new video information being recorded over the video information showing the event of interest. Therefore, the operator must watch the dial pointer closely and may be distracted and miss an event which he would otherwise prefer to record.

SUMMARY OF THE INVENTION

The present invention relates to a slow motion recording and playback system in which a usage display is generated in the form of a dot which appears on the video monitor at the perimeter of the monitor. At the beginning of the recording process, the dot may, for example, appear at the upper left-hand corner of the screen and, during recording, the dot will progress in a clockwise manner around the periphery. The stationary dot will also appear in the upper left-hand corner to indicate the point at which recording began. When recording is terminated, a third dot will appear at the termination point, so that the operator will not continue on beyond this point during replay. The system disclosed in this application further provides for placing a stationary cue dot at a point along the periphery of the monitor when an event of interest is noted, such that the operator may return to this point later for viewing during replay.

The video recorder and playback system of the present invention for storing video information consisting of video frames successively presented at a standard frame rate, each of the frames including a first video field of a first field type and a second video field of a second field type, and for playing back the video information in a desired sequence to produce a video output signal providing either slow motion or normal motion effects when viewed on a monitor, includes a frame recorder. The frame recorder has rotatable recording medium, transducer means for recording and playing back the video frames in recording tracks on the recording medium, and means for rotating the medium at the standard frame rate and for stepping the transducer means at the standard frame rate such that a video frame may be recorded in each of the recording tracks. A field delay means is responsive to the recorder for storing a field of video information and providing the stored field at its output.

Stepping means step the transducer means during playback to recording tracks on the recording medium in accordance with a sequence control signal. A switch means provides video output signals at its switch output and connects the switch output to the field delay means output or, alternatively, to the frame recorder in response to a delay field signal. Logic means, responsive to the field reference signal and the playback rate signal, provides the sequence control signal to the stepping means and, further, provides the delay field signal to the switch means. The video information is thereby replayed as recorded or in a different sequence from that in which it was recorded, the sequence of fields within the frames of the replayed video information being such that it consists of alternately presented fields of a first field type and a second field type.

The video recorder and playback system may further comprise means for generating the playback rate signal at a rate which is less than the field rate of the video information which is stored, whereby the replayed video information will provide a slow motion effect when viewed on a monitor.

The video recorder and playback system further includes means for generating a direction indicating signal, with the logic means including means responsive to the direction indicating signal for altering the sequence control signal. The transducer means be stepped by the altered sequence control signal to tracks on the medium in a sequence which is reversed from the sequence in which the fields of video information were recorded, whereby the replayed video information will provide a reverse motion effect when viewed on a monitor.

The video recorder and playback system may further include means for terminating the playback rate signal, whereby the replayed video information will produce a stop-action effect when viewed on a monitor. The switch means provides its output to a chroma inverter which inverts the chroma component of the video signal applied thereto in response to a chroma invert signal. The logic means will supply the chroma invert signal to the chroma inverter, whereby the sequence of frames and sequence of fields within the frames of the replayed video information is such that it consists of alternately presented video frames of a first and second frame type, with each of the frames including a first video field of a first field type and a second video field of a second field type.

The video information recorded may be divided into segments with a cue signal means providing a cue signal at selected times during recording of the segments of video information. A means for generating a clocking signal as successive segments of video information are recorded or replayed provides an output to a counter means which cyclically assumes successive count states in response to the clocking signal. A latch means is responsive to the counter means and to the cue means for storing the count state of the counter means upon receipt of each of the cue signals. Means is provided for generating a cue display signal in response to the latch means whereby the cue display signal may be superimposed upon the video information as it is replayed.

Accordingly, it is an object of the present invention to provide a recording system incorporating a frame recorder and a field store which are controlled to provide slow motion video output signals during replay; to provide such a recording system in which a visual indication of the progress of the recorder during recording and replay is provided to a video monitor; and, to provide such a system in which a properly sequenced NTSC video color output signal is provided.

Other objects and advantages of the invention will be apparent from the following description, the accompanying drawings and the appended claims.

BRIEF DESCRIPTION OF THE DRAWINGS

FIG. 1 is a schematic diagram showing the recording system of the present invention, including a monitor and control console arrangement.

FIG. 2 is a block diagram representation of the recorder and associated control circuitry;

FIGS. 9A and 9B, when assembled with FIG. 9A to the left of FIG. 9B, form an electrical schematic representation of the stepper control logic for sequencing the position of the transducer heads;

FIGS. 10A, 10B, 10C and 10D, when assembled with FIG. 10A above 10B and FIG. 10C above 10D, with FIGS. 10A and 10B to the left of FIGS. 10C and 10D, form an electrical schematic representation of the cue display logic;

FIG. 12 is an electrical schematic representation of control logic for controlling the auto search function.

DETAILED DESCRIPTION OF THE PREFERRED EMBODIMENT

Figure 1A:
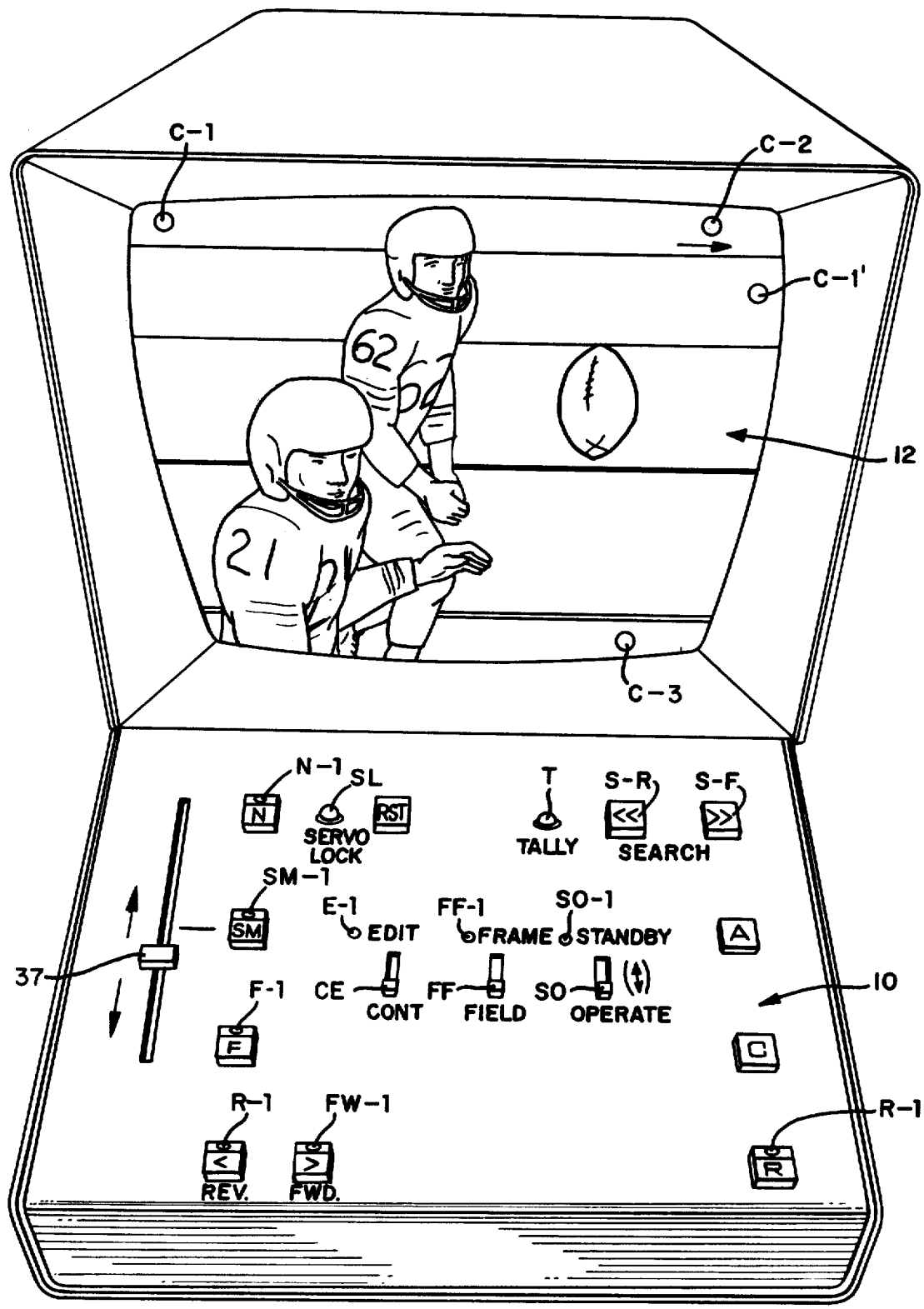
FIG. 1A is an enlarged view of the monitor and console.

FIG. 1 shows the overall recorder system of the present invention. A control console 10 includes the various operator control switches and a cathode-ray tube display 12. The control logic 15 is shown diagrammatically as removed from the console 10, although some of the logic may actually be incorporated within the console. The video frame recorder 20 includes a two-sided rotatable recording disc 22, and upper and lower transducer means 24 and 25 for recording and playing back video frames in circular recording tracks 26 on the upper and lower surfaces of disc. The disc recorder also includes a drive motor 27 which provides a means for rotating the disc 22 at the video frame rate.

As discussed previously, the standard NTSC color video signal includes video frames of a first and a second frame type. Frames of the first type include a chroma component the phase of which is 0° at the beginning of the frame and 180° at the end of the frame. Frames of the second type include a chroma component the phase of which is 180° at the beginning of the frame and 360° at the end of the frame. Video frames of the first frame type are recorded on the upper surface of the disc 22 by the transducer 24, while video frames of the second frame type are recorded on the lower surface of the disc 22 by transducer 35.

Drive motor 27 includes a drive amplifier and a motor feedback tachometer. Means for stepping the upper and lower transducer means to successive tracks 26 on the disc 22 include stepper controllers 30 and 32.

The transducer heads are conventional and each includes an erase head gap which precedes the record/playback portion of the transducer head. Each recording surface on the disc 22 is capable of storing a video frame in each of the 300 circular recording tracks 26, thus providing a total of 600 frames of storage, or approximately 20 seconds of video picture information storage in the NTSC system. Camera 35 is one typical source of video information to be recorded. Video information which is stored and played back by the recorder is provided on output 36, typically for use by a television station or network.

The video frame recorder system of the present invention includes circuitry for monitoring and displaying a video indication of the progression of the transducers 24 and 25 to successive tracks 26 on the disc 22 during both the recording process and the playback process. The operator commences the recording operation by depressing an appropriate record switch on the console 10. Successive frames of the video signal will then be recorded alternately on the upper and lower recording surfaces of the disc 22. The transducer heads 24 and 25 are stepped alternately while the opposite transducer head is recording in a fashion such that heads skip every other track as they move progressively inward toward the center of the disc.

At the outer limit of head motion, after each of the heads has covered 150 tracks on its associated recording surface, a limit control, such as a photocell detector, detects the position of the heads and reverses the operation of the steppers 30 and 32. At this point the heads will commence stepping inwardly toward the center of the disc, with the heads being aligned with the tracks which were skipped during their outward stepping progress. Each transducer head will therefore record on the odd numbered tracks as it is stepped radially inward, and will record on the even numbered tracks as it is stepped radially outward. A track counter which is reset by the photocells at the outer head stepping limits will keep track of the movement of the heads to reverse their direction of movement at the inner head stepping limit, causing the heads to step outwardly and record over the previously recorded information on the odd numbered tracks.

When the operator presses the recording switch on the console 10, a cue display dot C-1 will appear upon the cathode-ray tube at a point on the periphery of the tube corresponding to the position of the heads at that time. As the recording process progresses, a moving cue dot C-2 will be generated and will leave the stationary dot C-1, indicating to the operator the progress of the recording operation. The dot C-2 will move in a clockwise fashion around the periphery of the cathode-ray tube display 12 in synchronism with the movement of the transducer heads 24 and 25 across the recording surfaces of disc 22. The moving dot C-2 will traverse the entire periphery of the cathode-ray tube during one full recording sequence, which is equal to 20 seconds of real time video information. The operator will at the same time observe on the cathode-ray tube the video signal which is being recorded.

Should the operator determine that a point of interest has been reached during the recording process, a cue button on the console 10 may be depressed resulting in the generation of a dot C-1' which will momentarily coincide with the progressing dot C-2 but which will be stationary on the cathode-ray tube display, indicating this point of interest. The cue dot C-1 will at this point no longer be displayed. When the recording operation is terminated, a further cue mark C-3 will be generated which will remain on the cathode-ray tube, indicating the point at which recording was terminated. The dots C-1' and C-3 are displayed on the cathode-ray tube during the playback of the recorded video information. The moving dot C-2 is also displayed during playback, providing an indication of which portion of the recorded video information is then being replayed. An auto search mode is also provided, which is initiated by the appropriate control buttons on the console 10 to step the recorder rapidly, that the dot C-2 is returned to be coincident with dot C-1 or C-1'. The transducer heads 24 and 25 are thereby positioned appropriately for replaying the event of interest which was indicated by dot C-1 or C-1'.

Playback of recorder information from the video recording disc 22 may be accomplished in either the forward or reverse direction and at either normal or slow motion rates. If the slow motion mode of playback is chosen, the rate at which the playback occurs is controlled by a sliding control 37 by which the operator can vary the rate at which the transducers 24 and 25 are stepped across the surfaces of the disc 22. It will be understood that in such a slow motion playback mode the frames of video information will be provided successively to the cathode-ray tube monitor 12 and to the video output line 36 at the conventional NTSC frame rate of 30 frames per second. The sequence of frames in slow motion playback will, however, include frames having identical video information in order to effectuate the slow motion playback effect. The details of the operator control of the recorder during record and playback are disclosed more completely in U.S. patent application Ser. No. 842,247, filed Oct. 14, 1977, and assigned to the assignee of the present invention, the disclosure of which is incorporated by reference herein.

The signal handling and control logic is shown schematically in FIG. 2. Video information is applied to an input processor 40, which includes a filter 42, a sync strip circuit 44, and a switch 46. The input video is applied to line 48 and is filtered by filter 42 which has a bandwidth of approximately 4.5 MHz. An external sync signal, applied to line 50, may typically be derived from station sync. Switch 46 applies either the input video or the external sync to the sync strip circuit 44 which, in turn, provides a disc sync output on line 52. The sync signal is also applied to the clamp circuit 54 of the modulation unit 56. The modulator 58 is a standard automatic frequency control modulator which clamps the modulating frequency to a specific reference frequency, typically 7.9 MHz.

The modulator output goes to lines 60, 62 and 64. The line 60 is used when it is desired to bypass the recording system completely, at times other than during playback, as well as during certain test operations. The output of the modulator 56 is also applied to record/playback amplifiers 66 and 68. These amplifiers cooperate with transducer heads 24 and 25, respectively, during both recording and playback.

Inputs 70 and 72 to the amplifiers control the sequencing and operation of the amplifiers during the recording and playback modes of operation. Equalizers 74 and 76 receive the video outputs from the amplifiers 66 and 68, respectively, and provide these video outputs to a switch 78. Equalizers 74 and 76 equalize the reproduced video signal such that the correct amplitude and phase response is obtained during playback. Switch 78 switches in synchronism with the alternating operation of the transducer heads 24 and 25 during both recording and playback. The output from switch 78 goes through switch 80 to a demodulator and filter circuit 82.

Switch 80 will be switched into its lower switching position during playback and will be switched into its upper position during recording so that the monitor may be provided with the video signal at the same time that it is recorded onto the disc 22. A dropout detector circuit 84 detects when a portion of the video signal is missing and provides an output to line 86 when this occurs to initiate drop out correction, as discussed below. The filters, modulators, demodulators, amplifiers, dropout detector, and equalizers, are all well known in the art and are incorporated into most prior art video disc recording systems.

Also standard in video disc recorders is a servo control for controlling rotation of the disc 22. This control includes the motor 27, having a tachometer, the servo circuit 88, and drive amplifier 90. Control logic circuit 92 provides control signals to the aforementioned circuitry to control circuit operation. The manner in which the control logic 92 controls operation of the system is determined by input information applied through the console 10.

The video output from the recorder is applied through the demodulator filter circuit 82 to a time base corrector circuit 94, the details of which are discussed below. This circuit performs a number of functions, including correcting for time base errors and, simultaneously, providing a slow motion playback sequencing of reproduced video fields. The time base corrector circuit 94 includes digital storage, termed a field store, for storing video fields as required to produce a slow motion effect. The time base corrector circuit 94 includes circuitry which adjusts the type of frame and field provided at its output such that the frame and field types will agree with those which are required for proper synchronization with the station signal. Time base corrector 94 also includes a dropout circuit which corrects the video information in the event of occurrence of a dropout condition. The corrected video, provided at output line 96, is supplied for use as the television station signal. The corrected video is also supplied to a cue video amplifier 98 which adds a cue display signal from the control logic 92 on line 100 and to produce a control display video output on line 102 for display by the cathode-ray tube included in the control console 10.

Control logic 92 provides four control signals to the time base corrector circuit 94. A delay line command signal is provided when an odd field is retimed such that it becomes an even field. The VCO invert signal is provided to a voltage controlled oscillator in the time base corrector to compensate for discontinuities in the stripped burst signal to which the time base corrector circuit is locked. The chroma invert signal controls inversion of the chroma component of the output video signal by the time base corrector in order to maintain the proper chroma phase relationship. The delay field signal controls insertion of a field store into the video signal channel in the time base corrector when the recorder is in the slow motion or freeze modes of operation.

The upper and lower stepping control circuits 30 and 32 are identical and are well known in the art. In general they each comprise a stepping motor which drives a mechanism, such as a lead screw, to move the transducer heads radially along the recording surfaces of the disc 22. Each stepping motor includes a plurality of drive coils which are selectively energized in a predetermined sequence to rotate the lead screw driving mechanism.

Figure 3:
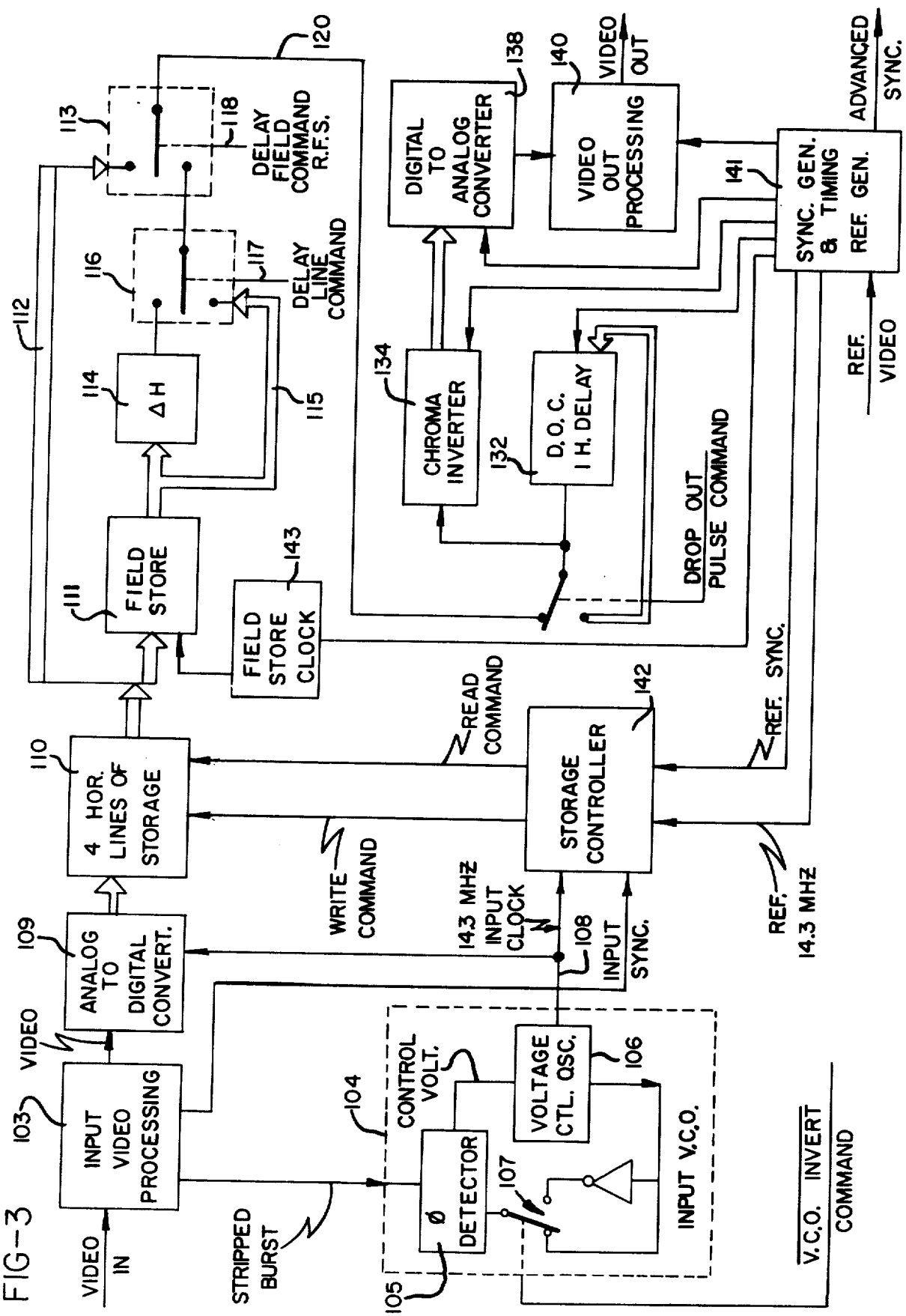
FIG. 3 is a schematic representation of the time base correction and field store portion of the present invention.

Reference is now made to FIG. 3 in which the time base corrector circuit of the present invention is diagrammatically illustrated. Video information is applied to an input video processing circuit 103 from the demodulation and filtering circuit 82 (FIG. 2). The burst portion of the video signal is stripped by the circuit 103 and applied to the phase locked loop circuit 104. A phase detector 105 compares the output phase of the voltage controlled oscillator 106 to the stripped burst signal to hold the oscillator output locked to the burst signal. A VCO invert command controls switch 107 to invert selectively the voltage controlled oscillator 106 output. Inversion of the oscillator output is necessary where a single frame is played repetitively, since this will result in a discontinuity in the burst portion of the video signal in each successive frame. The output of oscillator 106 on line 108 is a 14.3 MHz clock signal which clocks the time base corrector circuit.

An analog to digital converter 109 converts the video information into digital form and supplies it to a four line storage circuit 110. Circuit 110 corrects slight time base fluctuations in the reproduced video signal and provides the time base corrected video signal at its output to a field store circuit 111 which is capable of storing an entire field of video information. The output of circuit 110 is also applied to line 112 which provides a bypass around the field store circuit 111 to a switch 113. The output of the field store 111 is applied to a one line delay 114 and also to a line 115 which provides a bypass around the delay 113 to a switch 116. The switching state of switch 116 is controlled by a delay line command on line 117, while the switching state of switch 113 is controlled by a delay field command signal, also termed a READ FIELD STORE (R.F.S.) on line 118.

If it is desired to display repetitively a single field, for instance, the frame in which this field appears will be repetitively replayed from the disc recorder and processed through the various circuits until it reaches the output of circuit 110. Assuming that the first field of the frame is to be supplied to the monitor repetitively, the switch 113 will initially be switched to its upper switching position, providing the first field at its output. Simultaneously, the first field will be loaded into the field store 111. As the second field of the frame is supplied to the input of the field store 111 and also to line 112, the switch 113 will be switched into its lower switching position and, neglecting for the moment the operation of delay 114 and switch 116, the first field of the frame will then be read out of the field store 111 and applied to switch 113. After this operation is complete, the switch 113 will again be switched to its upper switching position, as the first field of the frame is supplied to line 112. Thus, by actuation of the switch 113, the first field of the frame will be repetitively applied via switch output to line 120. The video information in digital form is clocked into and out of the field store 111 in synchronism with the station reference timing. Thus a field which was originally odd as recorded onto the disc will be read out of the field store 111 at the appropriate time to change the field into an even field if an even field is required by the station reference timing.

A delay line command on line 117 will result in the switch 116 being switched into its upper switching state and the output of the field store 111 delayed by one horizontal line time. It will be appreciated that adding the one line delay will result in each line of the delayed field being shifted downward on a monitor by a distance equal to the vertical inter-line spacing of a field. Since a field in the NTSC system includes 262½ lines of video information, changing an odd field into an even field will result in a vertical shift of the horizontal video lines on the monitor in a direction which is opposite to the vertical shift experienced when an even field is changed into an odd field. In either case, the vertical shift experienced will be equal in magnitude to one-half of the vertical inter-line spacing of a field.

To avoid shifting lines of video both upward and downward on the monitor as successive frames of video information are reconstructed, one line delay 114 is inserted into the video channel by switch 116 as the even fields are changed into odd fields and the one line delay is removed as the odd fields are changed into even fields. This will, in turn, result in a shift of video lines on the monitor which is always downward. Thus the undesirable jumping effect between frames which would otherwise result is eliminated.

A one line delay 132 is provided and is switched into the signal path to repeat the previous line when a dropout condition is detected. The video signal is then provided to a chroma inverter 134 which separates the chroma component from the balance of the video signal and inverts it when necessary. As previously discussed, video frames in the NTSC system are either of a first type, in which the chroma phase goes from 0° at the beginning of the frame to 180° at the end of the frame, or of a second type, in which the chroma phase goes from 180° at the beginning of the frame to 360° at the end of the frame. It will be appreciated that conditions will arise, especially in slow motion or freeze modes of operation, in which the chroma phase of the video signal provided on line 120 will be opposite that required for proper chroma passing with the station or network signal.

A CHROMA INVERT signal is generated when necessary by the control logic, resulting in the chroma component being inverted. The chroma inverter circuits are well known in the art. After correcting for chroma phase discontinuity, the video signal is converted to analog form by means of converter 138, and processed by circuit 140. Video processing circuit 140 adds sync and burst signals to the reproduced video signals. The sync generator and timing reference generator circuit 141 provides reference sync and reference 14.3 megahertz signals to the storage controller 142, which in turn controls operation of circuit 110. Circuit 141 supplies an advanced sync signal to the servo loop which rotates the recording disc. The advanced sync signal is used during playback to compensate for timing delays in the video processing circuitry by reading recorded video advanced in time by an appropriate period. Circuit 141 also provides the necessary timing signals to the field store clock 143, delay 132, chroma inverter 134, converter 138, and processing circuit 140.

Figure 4:
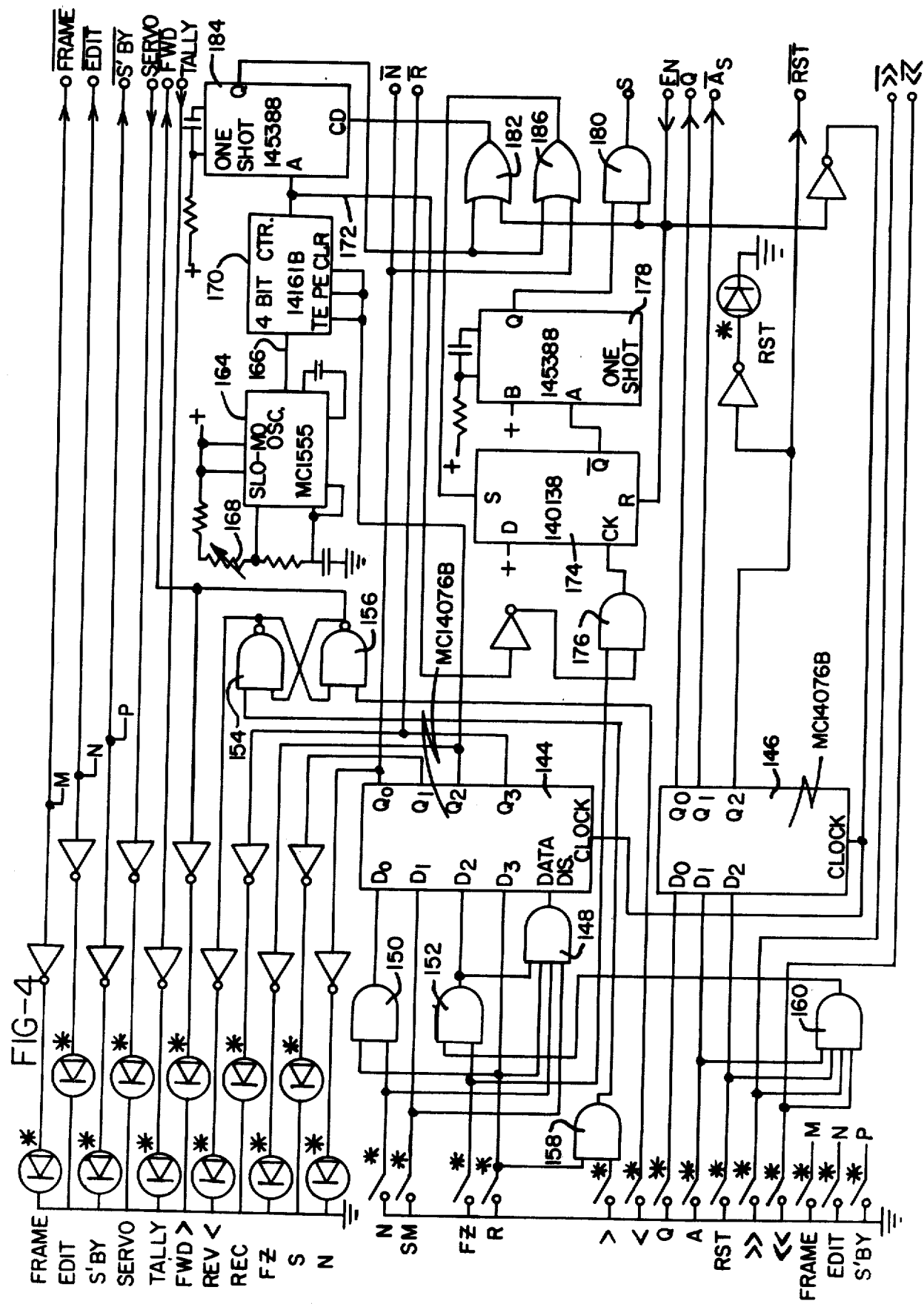
FIG. 4 is an electrical schematic representation showing the input control and associated logic.

Reference is now made to FIG. 4 which shows a portion of the control logic of the present invention. The circuitry of FIG. 4 includes a plurality of switches labeled N, SM, FZ, R, >, <, Q, A, RST, >>, <<, FRAME, EDIT, and S'BY. Each of these switches is located on the console 10 (FIG. 1) and each of these switches is connected to ground. An asterisk is associated with the right-hand side of each switch and indicates that a bias potential is applied to this side of the switch via a pull-up resistor. The output from each switch will therefore be high whenever the switch is open and will be at ground potential only when the switch is closed. Similarly, light emitting diodes are labeled as FRAME, EDIT, S'BY, SERVO, TALLY, FWD>, REV<, REC, FZ, S, N, and RST. Each of these light emitting diodes has associated therewith a driver which will hold the anode of the diode at ground until the associated switch is closed. When a function is selected and a switch closed, an appropriate light emitting diode will receive current through an associated driver. It should be noted that asterisks are associated with the anode of each of the light emitting diodes, indicating that a DC bias potential is applied at this point through a pull up resistor to assist the driver in energizing the diode. The light emitting diodes are positioned on the console 10 (FIG. 1) and provide an indication of the selected function.

A pair of latches 144 and 146 are provided in the circuit in order to "debounce" the switch outputs.

Latch 144 is normally disabled by a high output from AND gate 148 to the data disable input. When one of the switches associated with latch 144 is closed, the AND gate 148 will provide a low output to latch 144, thereby permitting the latch to change state in response to the signals supplied to its $D_0$, $D_1$, $D_2$, and $D_3$ inputs. The $Q_0$, $Q_1$, $Q_2$ and $Q_3$ outputs of latch 144 will latch to the signal level provided at inputs $D_0$, $D_1$, $D_2$ and $D_3$, respectively. The latch 144 is clocked by the $F_N$ signal, which is a field reference signal occurring every 1/60 of a second. Once a switch is depressed and latch 144 changes state, it will not be enabled by a clock signal to change state until the next successive $F_N$ pulse. By the time this occurs, any transients occurring as a result of switch bounce will have died out.

The functions controlled by the switches are as follows. The N switch provides for operation of the recorder at the normal video rate. The SM switch provides for slow motion operation of the recorder. The FZ switch is a freeze switch which causes the recorder to replay only a single field or frame. Subsequent actuation of the FZ switch will cause the recorder to replay each successive field or frame, also in a freeze mode. The R switch is the record function switch. The > switch controls forward playback, while the < switch controls reverse playback. The Q switch causes a cue dot to be displayed upon the cathode-ray tube monitor 12 (FIG. 1). The A switch is an auto search function switch. The RST switch is a reset switch which is used to return the transducer heads to their initial positions at the periphery of the recording disc, in the event that they should somehow become unsynchronized from the system controls.

The > > switch is a fast forward search switch, and the < < switch is a fast reverse search switch. The last two switches control manual searching in which the transducers are rapidly stepped to successive track locations under operator control. The FRAME switch, if closed, will cause the recorder to play back a complete frame of two interlaced fields. Normally this switch will not be closed when slow motion operation is desired, since the picture content of two successive fields may differ sufficiently to cause a jitter effect as these fields are repetitively displayed. The EDIT switch permits a portion of a video input signal to be recorded onto the disc. When the EDIT switch is closed, the operator may record video information onto the disc by closing simultaneously the N switch and the R switch. As soon as these switches are opened, recording will cease. By closing the FZ and R switches simultaneously, single frames of video information will be recorded. The S' BY switch is a stand-by switch, which will cause the transducer heads to be retracted from the surface of the video recording disc.

AND gate 150 provides a low signal to latch 144 whenever either the N switch or the R switch is closed. This insures that recording is always accomplished at normal speed. Similarly, whenever the A switch, the RST switch the > > switch or the < < switch is energized, the AND gate 152 will provide a low signal to latch 144. AND gate 152 therefore assures that after the auto search, the reset, the fast forward search, and the fast reverse search functions are chosen, the recorder will be left in the freeze mode of operation. NAND gates 154 and 156 form a flip-flop which is set or reset depending upon whether the forward or reverse mode of operation is chosen. AND gate 158 will set this flip-flop when either the R switch or the > switch is closed.

Similarly, the flip-flop will be reset when the < switch is closed.

Latch 146 is a momentary latch arrangement. The $Q_0$-$Q_2$ outputs will only go low for as long as the switches associated with latch 146 are closed. Latch 146 is also clocked by a field rate signal to "debounce" the switch outputs.

The S output from AND gate 162 is a playback rate signal which controls the rate at which successive fields of video information are reproduced, both in the normal and slow motion modes of operation. A slow motion oscillator 164 provides an oscillator output on line 166 which is controlled in frequency by the setting of variable resistor 168 and can be varied from 960 Hz to 0 Hz. The lever 37 (FIG. 1) on the console 10 of the reactor unit provides a means of adjusting resistor 168. A divide-by-16 counter 170 supplies pulses to line 172 which vary between 60 Hz and 10 Hz. These pulses are applied to the clock input of flip-flop 174, via AND gate 176 when the FZ switch is not closed. Each of the pulses on line 172 will cause the flip-flop 174 to set since the D input of the flip-flop is attached to a DC bias. The next successive frame pulse $F_N$ will reset the flip-flop 174. The monostable multi-vibrator 178 will then supply a pulse, via AND gate 180, to the S output.

It will be appreciated that should the reset and clock inputs of the flip-flop 174 receive pulses simultaneously, the desired pulse output from the flip-flop will not occur. In order to avoid this situation, OR gate 182 will provide an enabling input to the multi-vibrator 184. If these pulses occur simultaneously, the multi-vibrator 184 will apply an output to OR gate 186 and this will, in turn, cause the flip-flop 174 to be set. The OR gate 186 will also maintain the flip-flop 174 in a set state whenever the normal mode of operation is selected. The pulse output from the flip-flop 174 will, therefore, be synchronized with the field rate signals $F_N$.

Figure 5:
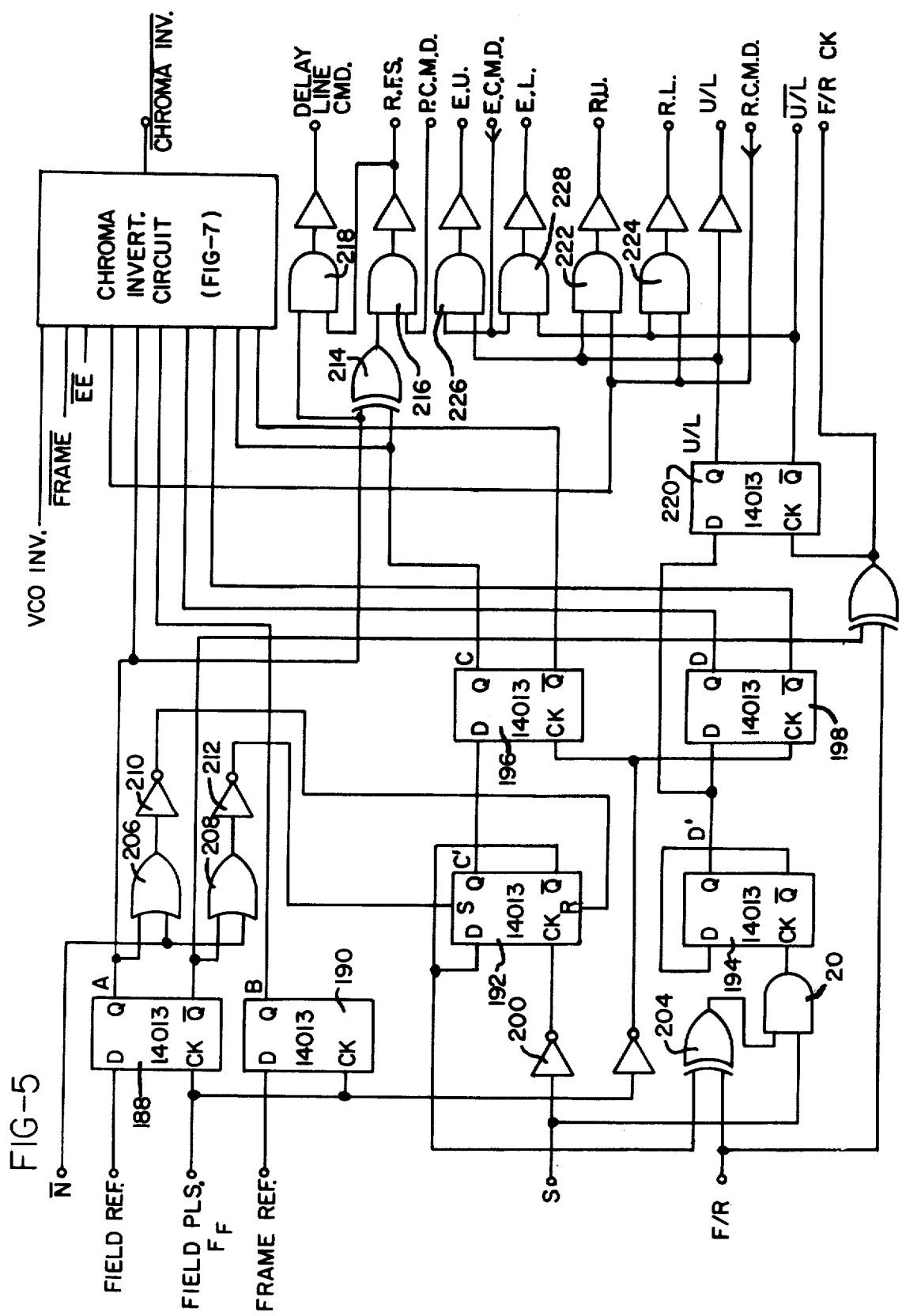
FIG. 5 is an electrical schematic representation showing the sequencing logic.

FIG. 5 illustrates a portion of the logic circuitry controlling the sequencing of the playback process. A flip-flop 188 provides an A output which is indicative of the type of field required by the station timing. Similarly, a flip-flop 190 provides a B output which is indicative of the type of frame required by the station timing. Flip-flops 188 and 190 are clocked by a field reference signal and flip-flop 190 receives a frame reference signal on its D input. Field reference pulse $F_F$ occurs at the field rate and is approximately 40 microseconds in duration. Thus flip-flops 188 and 190 specify by their outputs the type of frame and field which must be provided by the recorder in order for the recorder output to be used by the station.

Flip-flops 192, 194, 196, and 198, provide C', D', C and D signal outputs, respectively. Flip-flops 192-198 specify the type of frame and field which is presently being provided by the recorder. The difference in the states of the flip-flops 192-198 with respect to flip-flops 188 and 190, therefore, determines the processing which must be performed upon the playback frames and fields in order to provide the desired types of frames and fields at the recorder output. The S pulse signal is applied through INVERTER 200 to clock the flip-flop 192 and through AND gate 202 to clock the flip-flop 194. It will be recalled from the discussion above with respect to FIG. 4 that the S pulses are provided at the rate at which successive recorded fields are to be replayed. The $\bar{Q}$ output of flip-flop 192 is applied to an EXCLUSIVE OR gate 204 along with a F/R signal. EXCLUSIVE OR gate 204 will enable the AND gate 202 only on alternate S pulses so that the flip-flop 194 will change output states in synchronism with the flip-flop 192, but at half the rate. The F/R signal indicates whether the forward or reverse mode of operation has been selected and is derived by circuitry described below.

The flip-flops 196 and 198 are clocked by the field pulses and assume the state of flip-flops 192 and 194, respectively, but with a one field or frame delay. Stated another way, flip-flop 196 will assume the state which flip-flop 192 had previously assumed during the previous field interval. Similarly, flip-flop 198 will assume the state which flip-flop 194 had assumed during the previous frame interval. OR gates 206 and 208 and INVERTERS 210 and 212 are enabled by the $\overline{N}$ signal to set and reset flip-flop 192 in synchronism with flip-flop 188 when the normal mode of operation is selected. The flip-flops 196 and 198 provide C and D signals which indicate the field and frame type being read out of the field store, while the flip-flops 192 and 194 indicate the field and frame type being read directly from the video disc.

EXCLUSIVE OR gate 214 enables AND gate 216 to provide an R.F.S. signal (read field store) to the switch 113 (FIG. 3) when it is desired to read video information out of the field store. AND gate 218 provides the delay line command which determines the switching state of switch 116 (FIG. 3). Both of these outputs are in turn enabled only when the play command (P.CMD.) signal is present.

Flip-flop 220 provides a U/L output which determines whether a track on the upper surface of the recording disc or a track on the lower surface of the recording disc is to be read. Flip-flop 220 is also toggled during recording to control the surfaces upon which the frames of video information are recorded. The read command (R.CMD.) is applied to AND gates 222 and 224 and, in conjunction with the U/L and $\overline{U/L}$ signals, specifies whether the upper surface of the disc (R.U.) or the lower surface of the disc (R.L.) is to be read.

AND gates 226 and 228 provide signals to control erasing on the upper surface of the disc (E.U.) and on the lower surface of the disc (E.L.) under control of the erase command signal (E.CMD.). As discussed previously, each of the transducer heads includes an erase gap which slightly precedes the recording gap of the head and which erases previously recorded video information from the recording track prior to the recording operation. Separate control of the erasing function is required in order to terminate erasing slightly before the recording process is terminated. This, in turn, is necessary in order to prevent small unrecorded gaps on the recording tracks.

A chroma invert circuit is responsive to a plurality of signals and provides a chroma invert signal ($\overline{CHROMA\ INV.}$) at its output when it is necessary to invert the chroma phase of a frame which is replayed by the recorder. The chroma invert circuit is shown in greater detail in FIG. 7.

Figure 6:
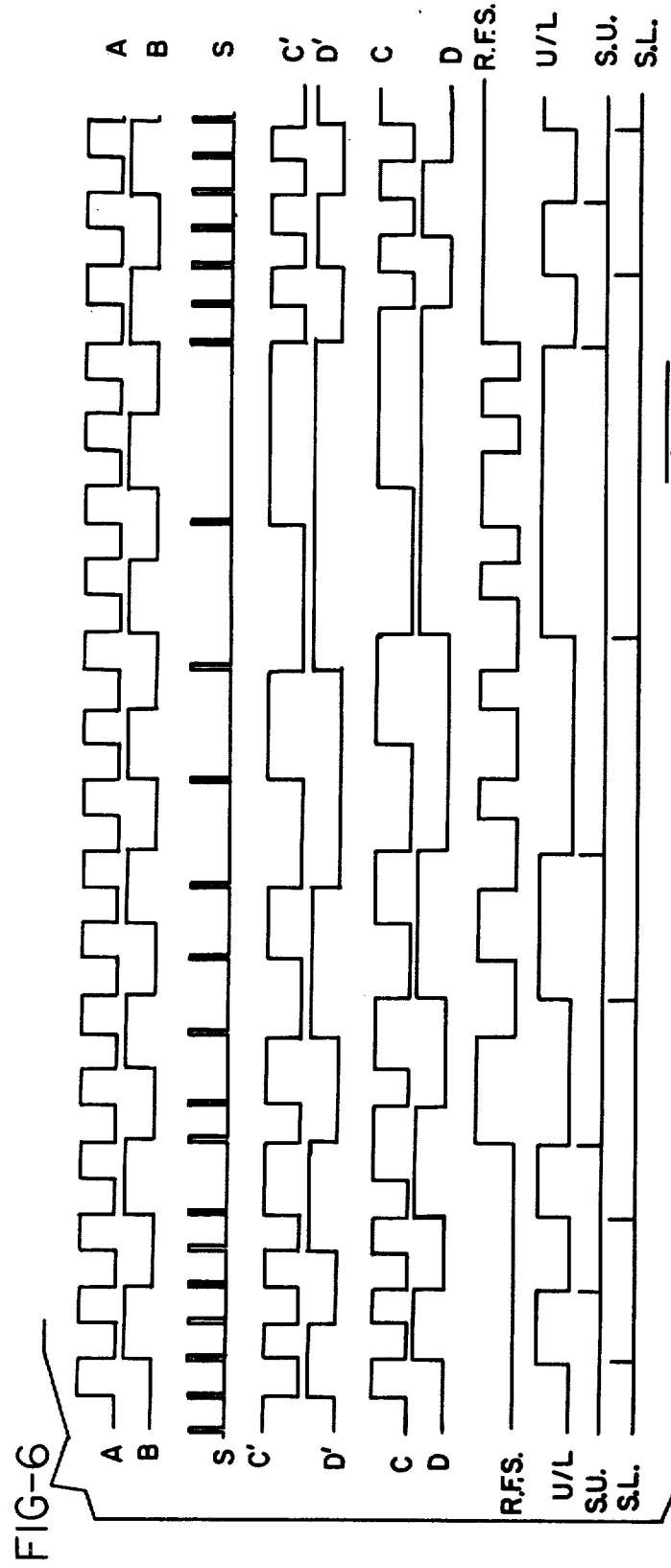
FIG. 6 is a timing diagram useful in understanding the operation of FIG. 5.

FIG. 6 illustrates the respective timing between the signals generated by the circuit of FIG. 5. Note that the C and D signals lag the C' and D' signals by one field time. Note further that the C' signal will change state only upon the occurrence of an S pulse. The D' signal changes state on each alternate S pulse. A pair of time lines marked as S.U. and S.L. show the points in time at which the upper and lower transducer heads are stepped, respectively. These do not correspond to a specific signal in the circuit of FIG. 5. Note that the upper head will be stepped on negative going transitions of the U/L signal, while the lower head will be stepped on the positive going transitions of the U/L signal.

Figure 7:
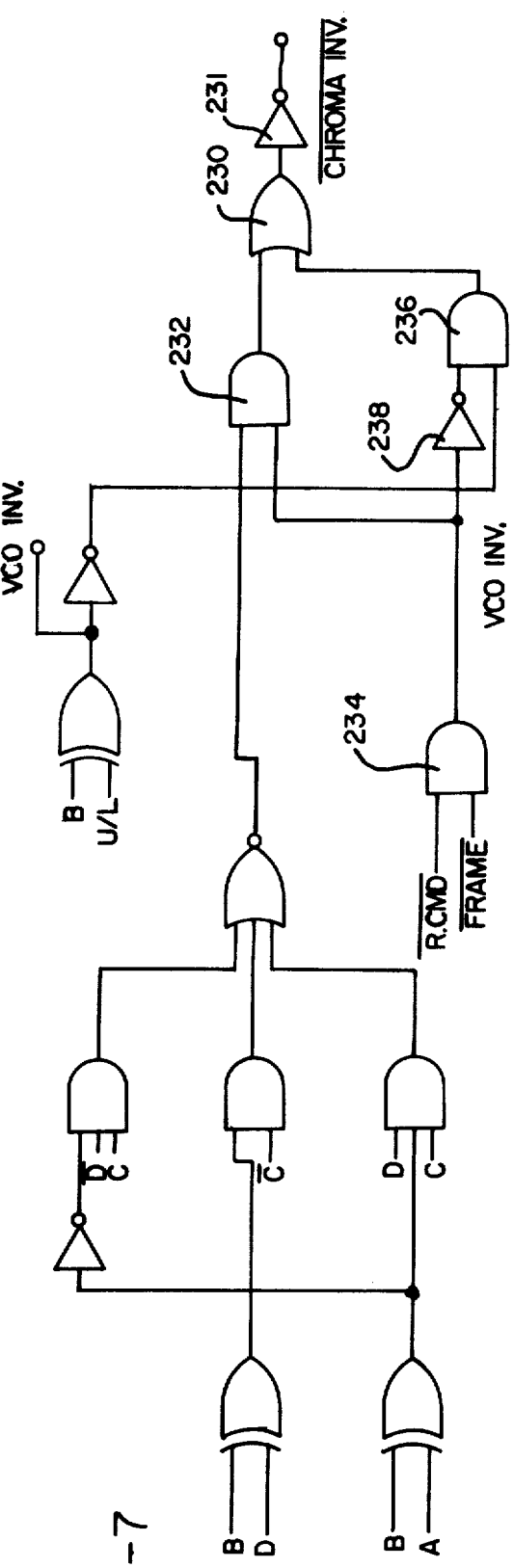
FIG. 7 is an electrical schematic representation showing a chroma invert control circuit.

Reference is now made to FIG. 7, illustrating the chroma invert circuit of FIG. 5 in greater detail. The $\overline{CHROMA\ INV.}$ signal is provided by OR gate 230 via INVERTER 231 unless AND gate 232 is disabled by either the $\overline{R.CMD.}$ signal or the $\overline{FRAME}$ signal going low and causing the output of AND gate 234 to go low. Should the output of AND gate 234 go low, AND gate 236 will be enabled, via INVERTER 238, such that the $\overline{CHROMA\ INV.}$ signal is controlled by the VCO INV. The VCO INV. signal will, in turn, be high whenever the B and U/L signals are equal in value.

Figure 8:
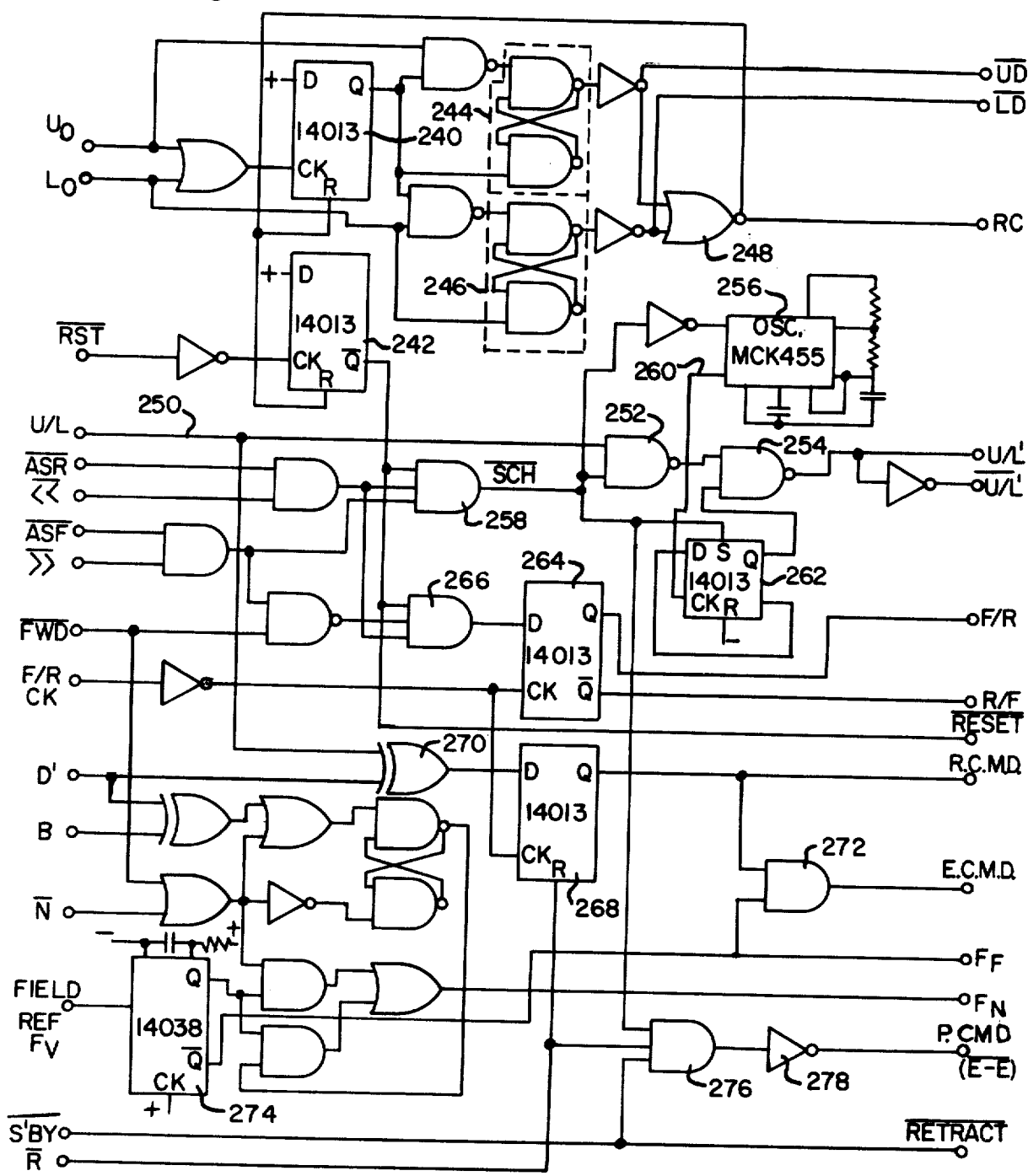
FIG. 8 is a schematic representation of the interface logic circuit.

FIG. 8 illustrates the interface logic which provides many of the control signals needed for operation. Most of the input signals are received from the controller circuitry of FIG. 4. Flip-flops 240 and 242 and associated circuitry are provided to control resetting of the transducer heads to their initial positions on the outer recording tracks when the reset function is selected. The input UO is supplied by a photocell at the outer track position of the upper transducer head and the input LO is provided from a photocell at the outer track position of the lower transducer head. The NAND gate flip-flops 244 and 246 will be set as the heads with which they are associated reach their respective outer track positions. When both of the heads have reached their outer track positions, the $\overline{UD}$ and $\overline{LD}$ signals will go low and NAND gate 248 will reset flip-flops 240 and 242.

The U/L signal is applied to line 250 and passes to the U/L' and $\overline{U/L'}$ outputs via NAND gates 252 and 254, except when modified by oscillator 256. When any of the $\overline{ASR}$, $\overline{<<}$, $\overline{ASF}$, and $\overline{>>}$ signals go low, the oscillator 256 which provides an output at approximately eight times the frame rate of the video signal, will be switched on. Additionally, the oscillator 256 will be switched on by flip-flop 242 when the reset mode of operation is selected. A low signal on the output of AND gate 258, designated $\overline{SCH}$, will switch on the oscillator 256. The frequency of the oscillator output on line 260 is divided by two by flip-flop 262 and the resulting signal applied to the U/L' and $\overline{U/L'}$ outputs via NAND gate 254. The U/L' signal controls the stepping of the transducer heads. The effect of the oscillator circuit is to cause the transducer heads to step at approximately four times their normal stepping rate when the auto search, reset, fast forward or fast reverse functions are chosen.

Flip-flop 264 is set by AND gate 266 when the forward direction of operation is selected. It will be noted that all of the reverse functions, including the reset function, will override the forward functions, causing the flip-flop 264 to be reset on the F/R CK pulse. The record command, R.CMD., is provided by flip-flop 268 and is generated by the comparison of the D' signal with the U/L signal in EXCLUSIVE OR gate 270. AND gate 272 provides the erase command signal, E.CMD., on its output and under control of the flip-flop 274, terminates the erase operation prior to the termination of recording to insure that no blank portions of the recording track on the disc remain after a record operation. NAND gate 276 and INVERTER 278 provide the play command, P.CMD. The flip-flop 274, in conjunction with the associated gating, also provides the $F_F$ and $F_N$ signals. The $\overline{RETRACT}$ signal is provided whenever the stand-by mode of operation is selected, as indicated by the $\overline{SBY}$ signal, to cause the transducer head to be removed from the disc recording surfaces.

Figure 9A:
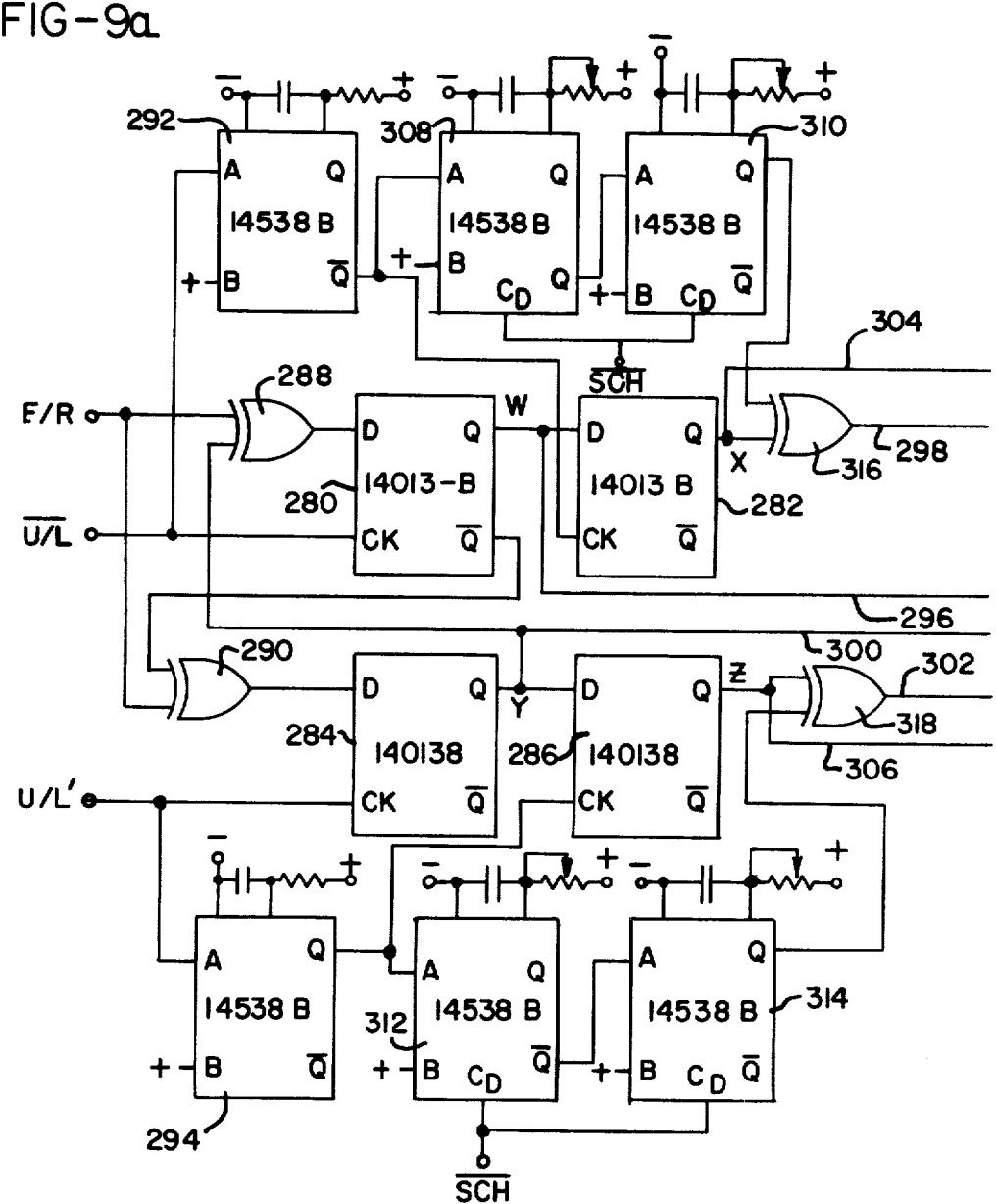
Figure 10A:
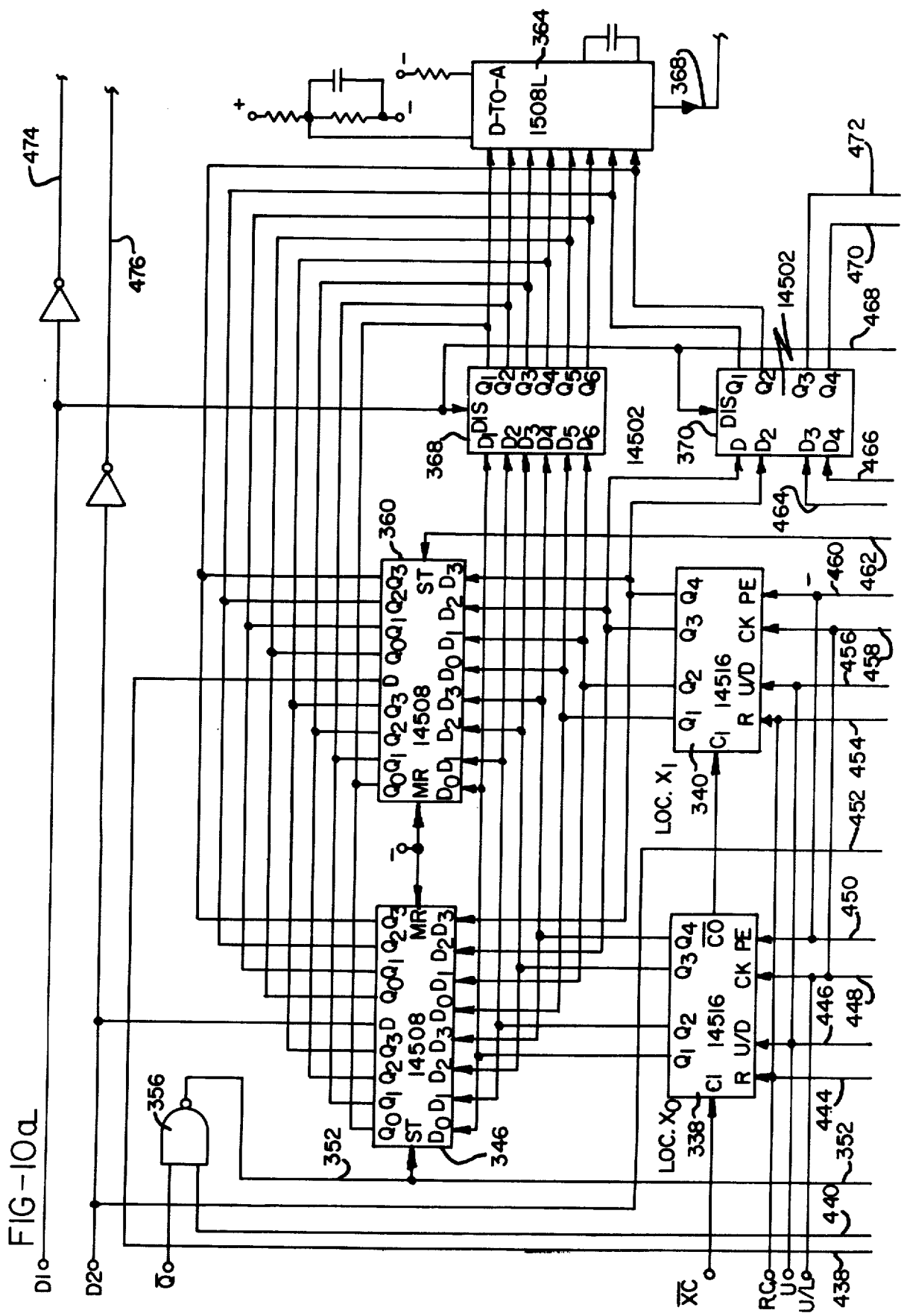
Figure 10C:
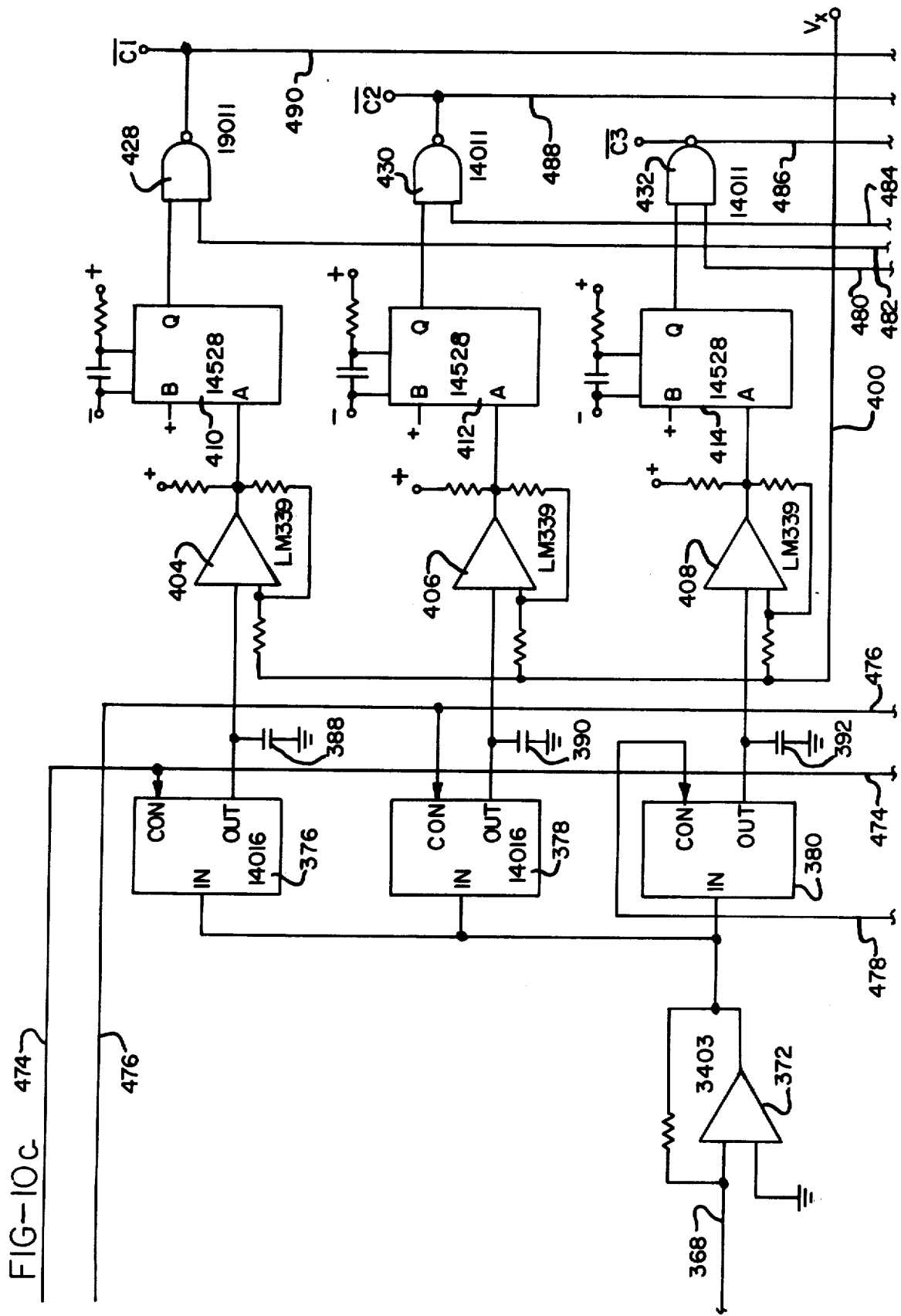

Reference is now made to FIGS. 9A and 9B which, when assembled with FIG. 9A to the left of FIG. 9B, illustrate schematically the circuitry which controls the means for stepping the transducer heads 24 and 25 (FIG. 1) across the recording surfaces of the recording disc during the recording and playback modes of operation. As mentioned previously, movement of the transducer heads may be effectuated by means of stepping motors which rotate threaded shafts upon which the transducer heads are mounted. As the stepping motor associated with a transducer head is rotated to successive positions, the associated transducer head will be moved to successive tracks on the recording disc.

Outputs U1, U2, U3, and U4 are provided to the stepping motor associated with the upper transducer head. Similarly, outputs L1, L2, L3, and L4, are provided to the stepping motor associated with the lower transducer head. The U3 and U4 signals are the inverse of the U1 and U2 signals, while the L3 and L4 signals are the inverse of the L1 and L2 signals. The direction of rotation of each motor is dependent upon the phase relationship of the signals applied to the motor. As an example, U1 will initially go high causing the motor to rotate incrementally in a forward direction. U2 will then go high, causing the motor to rotate an additional increment in the forward direction. U1 will then go low, causing a third increment of rotation in the forward direction. Finally, U2 will go low and the motor will be rotated one increment further in the forward direction. It is seen, therefore, that the U2 signal lags the U1 signal by 90°. If it is desired to rotate the motor in the reverse direction, the phase relationship between the U1 and U2 signals will be reversed such that the U1 signal will lag the U2 signal by 90°.

In order to provide the proper phasing between the U1 and U2 signals and the L1 and L2 signals, flip-flops 280, 282, 284, and 286 are provided. Flip-flops 280 and 284 are clocked by the $\overline{U/L'}$ and U/L' signals, respectively. As can be seen, EXCLUSIVE OR gates 288 and 290 cross couple the Q outputs of the flip-flops to provide for alternate state change by these flip-flops. The phasing between the W signal from flip-flop 280 and the Y signal from flip-flop 284 is determined by the F/R signal which is applied to EXCLUSIVE OR gates 288 and 290. Each time the X and Y signals change state, the associated stepping motor would be stepped by an amount sufficient to move the transducer head associated therewith to the next recording track. As discussed previously, however, the recording format used in the present invention is one in which each transducer head is stepped sequentially to every other recording track on the recording disc during the inward movement of the transducer head and each head is stepped to the intermediate recording tracks during the outward movement of the transducer head. In order to provide for stepping of the motors by two increments such that every other track is recorded or played, flip-flops 282 and 286 provide X and Z signals, respectively, which are timed by monostable multi-vibrators 292 and 294. Thus the X signal will follow the W by a predetermined time delay, and the Z signal will follow the Y signal by a predetermined delay in order to provide the double stepping action of the transducer heads.

The W signal is provided on line 296, the X signal is provided on line 298, the Y signal is provided on line 300, and the Z signal is provided on line 302, to the stepping motors by way of circuitry to be discussed below. Additionally, the X signal is provided on line 304 and the Z signal is provided on line 306 for use by circuitry which specifies whether the odd or even numbered tracks on the disc are to be played or recorded.

Monostable multi-vibrators 308, 310, 312, and 314 control EXCLUSIVE OR gates 316 and 318. EXCLUSIVE OR gate 316 will invert the X signal output on line 298 after a period of time determined by the multivibrators 308 and 310. This tends to reverse the operation of the stepping motor momentarily, thus providing a breaking action for the stepping motor which eliminates over-shooting of the desired track location. Multivibrators 312 and 314 provide an identical control operation in conjunction with EXCLUSIVE OR gate 318.

Application of the W, X, Y, and Z signals to the stepping motors is accomplished under the control of the data selector 320. Selector 320 will provide the $X_0$, $X_1$, $X_2$, and $X_3$ inputs to its $Z_0$, $Z_1$, $Z_2$, and $Z_3$ outputs, respectively, when the A control input is high. Similarly, selector 320 will connect the $Y_0$, $Y_1$, $Y_2$, and $Y_3$ inputs to its $Z_0$, $Z_1$, $Z_2$, and $Z_3$ outputs, respectively, when its B control input is high. The A and B controls for the selector 320 are provided by the F/R and R/F signals, respectively. As is clear, when the forward mode of operation is selected, the W signal will appear at the output $Z_0$, the X signal will appear at the output $Z_1$, the Y signal will appear at the output $Z_2$, and the Z signal will appear at the output $Z_3$. When the reverse mode of operation is selected, the W signal will appear at output $Z_1$, the X signal will appear at output $Z_0$, the Y signal will appear at output $Z_3$, and the Z signal will appear at output $Z_2$. The outputs of the selector 320 are applied to the stepping motors via AND gates 321, 322, 323, and 324. These AND gates are controlled by the $\overline{UD}$ and $\overline{LD}$ signals to disable operation of the stepping motors when the transducer heads are returned to their outermost position after the reset function is selected.

A latch 325 controls operation of EXCLUSIVE OR gate 326 which provides an additional single step rotation of the stepping motor, independent of the W and X stepping signals, when the upper transducer head has reached the end of its range of travel, either at the inner or outer recording track on the upper surface of the disc. This additional step provides for stepping of the transducer head to the tracks on the disc which were skipped during the previous pass of the transducer head across the disc surface. Similarly, flip-flop 327 controls operation of an EXCLUSIVE OR gate 328 to provide for a single step at each end of the range of movement of the lower transducer head. The photocell adjacent the outer track for the upper transducer head provides a signal on line 330 when the upper transducer head has reached its outer limit. A counter, not shown, is counted up as the upper head is stepped to successive tracks. When the counter reaches a predetermined count, the upper head will have been stepped to its inner most recording track. The counter will then apply a low signal to line 332. Similarly, the photocell and counter associated with the outer and inner positions, respectively, of the lower transducer head provide signals on lines 334 and 336, respectively, when the limits of travel of the lower transducer head are reached. The signals on lines 330-336 are then combined with the W, X, Y, and Z signals to gate the flip-flops 325 and 327 on and off in dependence upon the direction of movement of the transducer heads which has been selected.

FIGS. 10A–10D, when assembled, illustrate the cue display logic of the system of the present invention. Cue location binary counters 338, 340, 342 and 344, when enabled by low going signals on their CI inputs, will count the U/L' pulses provided to their clock inputs. The negated carry out $\overline{CO}$ output of counters 338 and 342 provides the carry in CI inputs for counters 340 and 344, respectively. Counters 338 and 340 are connected to count in tandem such that their outputs, indicated as LOC. $X_0$ and LOC. $X_1$, provide an indication of the X coordinate on a monitor of a cue dot corresponding to the track which is currently being recorded or replayed on the recording disc. Similarly, the counters 342 and 344 are connected to count in tandem such that their outputs, indicated as LOC. $Y_0$ and LOC. $Y_1$, provide an indication of the Y coordinate on a monitor of a cue dot corresponding to the track on the recording disc which is currently being recorded or replayed. The U signal is supplied to the up/down inputs of the counters in order to cause them to count forward or backward in dependence upon the direction of operation of the recorder.

The $\overline{XC}$ and $\overline{YC}$ signals control operation of the counters such that the counters 338 and 340 will count up to 86 while the count state of counters 342 and 344 remains 0. The counters 342 and 344 will then count up to 64, while the count state of counters 338 and 340 remains 86. The counters 338 and 340 will then count down from 86 to 0, while the count state of counters 342 and 344 remains 64. Counters 342 and 344 will then count down from 64 to 0, while the count state of counters 338 and 340 remains at 0. As will be understood, therefore, the count in the counters will define, in Cartesian coordinates, a rectangular path around the periphery of the cathode-ray tube display. The $\overline{XC}$ and $\overline{YC}$ signals are generated by the circuitry of FIG. 11, described below.

Latches 346 and 350 will store the output of the counters upon receipt of a strobe pulse on line 352. When the recording operation is initiated, the $\overline{R}$ signal will go low and monostable multi-vibrator 354 will cause NAND gate 356 to provide a strobe pulse to counters 346 and 350. A strobe pulse will also be provided by NAND gate 356 when the cue switch is depressed, causing the $\overline{Q}$ signal to go low. When the record operation has terminated, the strobe signal will be removed from line 358 causing the counters 360 and 362 to store the coordinate counts of the counters 338, 340, 342, and 344 at the point at which recording is terminated.

It will be appreciated that the instantaneous count in counters 338, 340, 342, and 344 will be an indication of the track on the recording disc which is currently being recorded or replayed. It will be noted that the counters have a total of 300 unique counting states. Since the counters are clocked by the U/L' signal at $\frac{1}{2}$ the frame rate, each of the 300 counting states will correspond to two of the 600 tracks on the recording disc.

The outputs from the counters and latches are multiplexed to digital-to-analog converters 364 and 366, which apply analog signals to output lines 368 and 370, respectively. The multiplexing operation is controlled by the D1, D2, and D3 signals. Each of the D1, D2, and D3 signals will go low for one field in a four field sequence. During the fourth field time, none of the D1, D2, and D3 signals will be low. When the D1 signal goes low, latches 368, 370, and 372 will provide the instantaneous count of the counters 338, 340, 342, and 344 to the converters 364 and 366. When the D3 signal goes low, the latches 360 and 362 will provide the count stored therein to the converters 364 and 366. Since the latches 360 and 362 will be strobed on during the entire recording process, this count will only differ from the instantaneous count of the counters after the termination of recording. When the D2 signal goes low, the latches 346 and 344 will provide the count stored therein to the converters 364 and 366. Counters 346 and 350 will initially contain a count corresponding to the cue display of the tracks upon which recording was initiated. If an event of interest should be noted during the recording process, however, and the CUE control on the console depressed, the $\overline{CUE}$ signal will go low, once again enabling latches 346 and 350 to store the instantaneous count of the counters. The latches 346 and 350 will thereafter provide an indication of the tracks corresponding to the event of interest. It will be noted that the initial recording cue display will be lost. However, by providing additional latching circuitry, display of both the initial recording position and the event of interest may be accomplished.

The analog outputs 368 and 370 from the D to A converters 364 and 366 are supplied to amplifiers 372 and 374. Switches 376, 378, 380, 382, 384, and 386 will demultiplex the amplifier outputs under control of the D1, D2, and D3 signals. Each switch will connect its data input to its data output upon receipt of a high signal at its control input. Capacitors 388, 390 and 392, will therefore be charged to potentials which are proportional to the X coordinates of the cue display dots. Similarly, capacitors 394, 396, and 398 will be charged to potentials which are proportional to the Y coordinates of the cue display dots.

A ramp function $V_X$ is provided to line 400. The $V_X$ signal on line 400 increases linearly from 0 to a predetermined potential level during each field interval. A ramp function $V_Y$ is applied to line 402. The $V_Y$ signal on line 402 increases from 0 to a predetermined potential level during each horizontal video line time. The signals $V_X$ and $V_Y$ are synchronized with the video being displayed to the control monitor. Comparators 404, 406, and 408 compare the X coordinate voltages from capacitors 388, 390, and 392 to the signal on line 400 and, when the potentials are equal, trigger the associated one of monostable multi-vibrators 410, 412, and 414. Similarly, the comparators 416, 418, and 420 trigger the monostable multi-vibrators 422, 424, and 426, when the signal on line 402 and the potentials stored in capacitors 394, 396, and 398 are equal.

When the multi-vibrator 410 triggers simultaneously with the multi-vibrator 422, the NAND gate 428 provides a low signal on its output, indicating that the timing is correct for display of the first cue dot. When the multi-vibrator 412 and the multi-vibrator 424 trigger simultaneously, NAND gate 430 will provide a low signal on its output indicating that the timing is proper for display of the second cue dot. Finally, when the multi-vibrator 414 and the multi-vibrator 420 fire simultaneously, NAND gate 432 will provide a low signal on its output, indicating that the timing is correct for display of the third cue dot. NAND gate 434 and INVERTER 436 will provide a $\overline{CUE}$ display signal when any of the cue dots is to be displayed.

Figure 11:
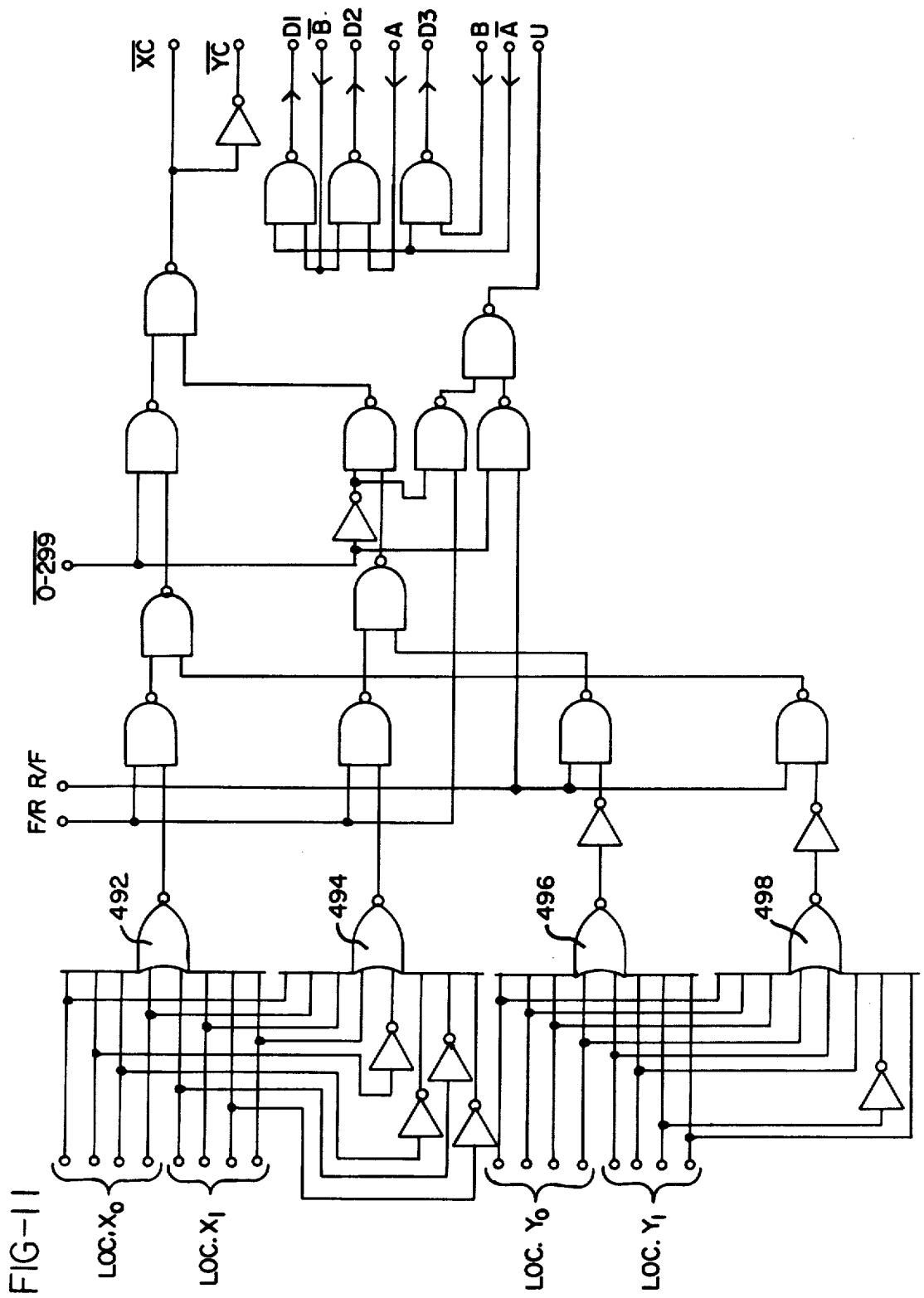
FIG. 11 is an electrical schematic representation of logic circuitry used with the circuit of FIG. 10 for displaying a cue signal.

FIG. 11 illustrates the decoder logic which is used to provide the $\overline{XC}$ and $\overline{YC}$ signals and the U signal to the counters in FIG. 10. FIG. 11 also illustrates the logic for deriving the D1, D2, and D3 signals from the field and frame signals A and B, respectively. The outputs from counters 338 and 340 in FIG. 10 are applied to NOR gate 492 and, with some inversion to NOR gate 494. Similarly, NOR gate 496 receives the outputs from counters 342 and 344, while the NOR gate 498 receives these outputs with one bit inverted. NOR gate 492 will provide a high output when the X coordinate counter state equals 0; NOR gate 494 will provide a high output when the X coordinate counter state equals 86; NOR gate 496 will provide a high output when the Y coordinate counter state equals 0; and NOR gate 498 will provide a high output when the Y coordinate count equals 64. Thus the NOR gates 492–498 define the corners of the rectangular path traversed by the cue dot on the cathode-ray tube monitor during recording and playback. The U output signal controls whether the counters count up or down.

Reference is now made to FIG. 12 which illustrates the circuitry controlling the auto search mode of operation. When in this mode of operation, the means for replaying recorded video will be returned to the record location on the magnetic recording medium associated with a cue signal. Counters 500 and 502 are connected to receive count enable pulses on line 503 which will cause the counters to change count state upon receipt of each pulse. W pulses are applied to the count enable inputs of the counters from flip-flop 280 (FIG. 9). When the recorder system is operating in the reverse mode of operation, the PE inputs of the counter will receive an enabling pulse via NAND gates 504 and 506 whenever the recording operation is initiated or the cue switch depressed. When this occurs, the $P_1$, $P_2$, $P_3$, and $P_4$ inputs of the counters 500 and 502 will receive a predetermined count of 150 via the lines connected to ground and to the $V_{cc}$ potential and a count of 150 will be loaded into the counters. The counters will have been enabled into their down-counting mode by the low going F/R signal on a line 508. The counters will now count down to zero as the transducer heads are stepped. When a zero count is reached, the transducer heads will have been stepped through one complete cycle across all of the recording tracks on the disc. The counter 502 will at this point apply a low-going pulse to its carry output CO which, through INVERTER 510 and NOR gate 512, will again load a count of 150 into counters 500 and 502. The counting down process will then begin. The counting state of the counters 500 and 502 therefore provides an indication of the position of the transducer heads.

Similarly, when the recorder system is operating in the forward mode of operation, the counters will be counted up from zero to 150, the count direction being controlled by the F/R signal on line 508. When the counters 500 and 502 reach a count of 150, all of the inputs to NOR gate 514 will go low. When this occurs, a reset signal will be applied to the counters 500 and 502 via NAND gates 516 and 518, NOR gate 520, and INVERTER 522. The reset pulse will reset the counters to zero and the counters will begin to count upward in synchronism with the W pulses applied to their count enable inputs. Whenever the record operation is initiated or the cue switch closed, gates 504 and 506 will load counters 500 and 502 with a count of 150. This will be detected immediately by the NOR gate 514 and the counters will therefore be reset to zero. Thus closing the cue switch or initiating a recording operation results, in effect, in resetting the counters to zero, when the counters are in their forward count mode.

A count detector 524 provides a low-going signal to a line 526 whenever the count state of counters 500 and 502 is greater than 76. It will be appreciated that when the count in counters 500 and 502 is greater than 76, the recorder will have stepped to a point in its recording cycle which is more than half way through the cycle from the point at which the cue switch was closed or recording initiated. It is desirable, therefore, that the recorder operate in the forward direction until the desired cue position is reached, since such operation will result in the shortest search time. Similarly, a high signal on line 526 indicates that a count less than 76 is in counters 500 and 502 and that, therefore, the recorder should operate in the reverse direction during the auto search mode of operation.

When the auto search mode is selected, the $\overline{AS}$ signal will go low, clocking the flip-flop 528 such that a high signal will be applied to line 530, indicating that the auto search mode is selected. A flip-flop 532 receives the signal on line 526 which indicates the direction which the search is to take. If a forward direction is selected by the decoder 524, the flip-flop 532 will be clocked such that a high signal is applied to line 534. The NAND gate 536 will thus provide a low signal at its output. Similarly, when the reverse direction of search is selected by the decoder 524, the flip-flop 532 will provide a high signal at its Q output to line 538. This will result in a low signal at the output of NAND gate 540. The $\overline{<<}$ signal will set flip-flop 532 and the $\overline{>>}$ signal will reset flip-flop 532 such that the $\overline{ASR}$ and $\overline{ASF}$ signals do not conflict with the $\overline{<<}$ and $\overline{>>}$ signals when the manual search of operation is selected.

The system will continue to provide the appropriate $\overline{ASR}$ and $\overline{ASF}$ signals until there is a coincidence of the $\overline{C1}$ and $\overline{C2}$ signal outputs. As seen from a review of FIG. 10, this will occur when the moving cue dot display is coincident with the cue dot display associated with either the initiation of recording or the occurrence of an event of interest. Coincidence of the $\overline{C1}$ and $\overline{C2}$ signals indicates that the recorder system has been returned to the appropriate point and this results in resetting the flip-flop 528 via NOR gate 542, thus terminating the auto search operation.

The integrated circuits which form a part of the circuitry illustrated in the drawings have all been labeled as to their respective standard integrated circuit part numbers. One source of these integrated circuits is Motorola Semiconductors, Phoenix, Arizona 85036.

It should be appreciated that while a recording system adapted specifically for recording and playback of video information in the NTSC format has been disclosed, the recording system of the present invention may be used with video information in other video formats by simple modification of the chroma processing circuitry.

While the form of apparatus herein described constitutes a preferred embodiment of the invention, it is to be understood that the invention is not limited to this precise form of apparatus, and that changes may be made therein without departing from the scope of the invention.

What is claimed is:

1. A circuit for use with a video recording system in which a plurality of segments of video information may be recorded and subsequently replayed in succession for display upon a video monitor, comprising:

cue signal means for providing cue signals at selected times during recording of said segments of video information, means for recording each of said plurality of segments of video information at one of a plurality of record locations on a magnetic recording medium, means for replaying said plurality of segments of video information from said record locations on said magnetic recording medium, means for generating a clocking signal as successive segments of video information are recorded or replayed, counter means for cyclically assuming successive count states in response to said clocking signal, storage means, responsive to said counter means and to said cue signal means, for storing the count state of said counter means upon receipt of each of said cue signals, and means for generating a cue display signal in response to said storage means whereby said cue display signal may be superimposed upon the video information during recording said replay.

2. The circuit of claim 1 in which a monitor is provided for monitoring the segments of video information during both recording and replay.

3. The circuit of claim 1 in which said means for generating said cue display signal includes:
means for storing the output of said storage means,
means for providing a vertical signal,
means for providing a horizontal signal,
means for comparing the outputs of said means for storing with said horizontal and vertical signals, and
gate means, responsive to said means for comparing, for providing said cue display signal at the appropriate vertical and horizontal display time.

4. The circuit of claim 1 in which said means for generating a cue display is further responsive to said counter means for providing a further cue display signal indicative of the segment being recorded or replayed.

5. The circuit of claim 1 further comprising auto-search means for returning said means for replaying to the record location on said magnetic recording medium associated with a cue signal provided by said cue signal means.

6. The circuit of claim 4 further comprising auto-search means for returning said means for replaying to the record location on said magnetic recording medium associated with a cue display signal, said autosearch means including means for terminating operation of said auto-search means upon coincidence of said further cue display signal with another of said cue display signals.

7. A circuit for use with a video recording system in which a plurality of segments of video information may be recorded and subsequently replayed in succession, while simultaneously being displayed upon a video monitor, comprising:
means for recording each of said plurality of segments of video information at one of a plurality of record locations on a magnetic recording medium,
means for replaying said plurality of segments of video information from said record locations on said magnetic recording medium,
means for generating a clocking signal as successive segments of video information are recorded or replayed,
counter means for cyclically assuming successive count states in response to said clocking signal, and
means for generating a cue display signal in response to said counter means, whereby said cue display signal may be superimposed upon the video information displayed upon the video monitor during recording and replay, and provide an indication of the record location upon which the video information is being recorded or from which the video information is being replayed.

8. In a video recording system for use in recording and playback of segments of continuous video information, including
a recording device having limited recording capacity,
a console including a monitor on which continuing video information is displayed to an operator for choice of video segments to be recorded, and
a record control on said console arranged to start and stop said recording device in response to operator actuation;
the improvement comprising
circuit means synchronized with said recording device and providing a usage signal in video form corresponding to the use of capacity of said recording device,
said circuit means having an output to said monitor causing a usage display thereon corresponding to the used capacity of recording device usage as recording proceeds together with the video information being recorded,
a cue control on said console coupled to said circuit means to produce a cue video signal on said monitor separate from said usage signal at the occurrence of a recorded event which it is anticipated to replay,
said circuit means including a memory operative to continue the cue video signal as the usage video signal progresses.

9. A video recording system as defined in claim 8, wherein
said usage signal is provided as a video signal moving a usage dot along a predetermined path on said monitor, and
said cue video signal produces a cue dot in a stationary position along the path of the usage dot.

10. A video recording system as defined in claim 9, wherein
said circuit means produces the usage signal to move the dot along the periphery of said monitor.

11. A video recording system as defined in claim 8, 9, or 10 wherein
said recording device operates in loop fashion to record, upon command, video information for a relatively short period as observed on the monitor.

12. A video recording system as defined in claims 8, 9, or 10 wherein
said circuit means including a second memory operative to produce a continuing video signal corresponding to the usage dot signal at the time the recording is stopped.

13. A video recording system as defined in claims 8, 9, or 10 wherein
said circuit means includes a third memory operative to produce a continuing video signal corresponding to the usage dot signal at the time the recording is started.

14. A video recording system as defined in claims 9 or 10, wherein
said circuit means includes a third memory operative to produce a continuing video signal corresponding to the usage dot signal at the time recording is started to represent the point at which further continued recording will supercede previously recorded video information, and said circuit means including means to substitute the cue video signal in said third memory upon actuation of the cue control.

15. In a video recording system, a recording device having video recording capacity limited in normal viewing time, a console including a monitor on which a continuing video program is displayed for choice of events to be recorded, controls on said console arranged to start and stop said recording device in both record and playback modes and to generate a cue signal in record mode in response to operator actuation, circuit means synchronized with said recording device to provide a usage signal corresponding to the progress of operation of said recording device, storage registers associated with said circuit means to store location information identifying a plurality of video frame locations within a recording of the program made on said recording device, one of said registers being operative to store cue location by actuating the cue control in the record mode, and means for converting the stored location information and the usage signal into a video signal for simultaneous display with the video program.

16. A video recording system as defined in claim 15 including another one of said registers being operative to store location information corresponding to the usage signal at the time the operator switches the controls out of the record mode, thereby providing a video display of the end of the recording.

17. A video recording system as defined in claim 15, including said one register being operative to store location information corresponding to the usage signal at the beginning of actuation of the record control.

18. A video recording system as defined in claim 17, wherein the cue location is stored in said one register in place of the begin record information.

19. A video recording system as defined in claim 15, wherein said recording device is a video frame disc recorder including at least one record/playback head and a step controller connected to move said head to record and playback different video frames from different circular tracks, up-down counter means, means driving said step controller and said counter means in synchronism, said storage registers being connected to receive location information from said counter means, and said converting means being connected to receive location information both from said counter means and said storage registers.

20. A video recording system as defined in claim 19, including means for operating said driving means in the playback mode at normal, fast, and slower than normal rates to play back the recorded video information at the standard viewing rate or at slower rates variable to stop motion, and to search the recording at higher than normal rates.

* * * * *